United States Patent
Wittorf et al.

(10) Patent No.: US 11,498,284 B2
(45) Date of Patent: Nov. 15, 2022

(54) CONTOUR-FORMING WELDING TOOL FOR PULSE WELDING AND CONTOUR-FORMING PULSE WELDING METHOD FOR A MEDICAL PACK FORMED AS A BAG

(71) Applicant: Fresenius Kabi Deutschland GmbH, Bad Homburg (DE)

(72) Inventors: Joern Wittorf, Friedberg (DE); Gerald Wegner, Friedberg (DE); Tobias Lenhardt, Friedberg (DE)

(73) Assignee: Fresenius Kabi Deutschland GmbH, Bad Homburg (DE)

( * ) Notice: Subject to any disclaimer, the term of this patent is extended or adjusted under 35 U.S.C. 154(b) by 0 days.

(21) Appl. No.: 17/265,317

(22) PCT Filed: Sep. 24, 2019

(86) PCT No.: PCT/EP2019/075616
§ 371 (c)(1),
(2) Date: Feb. 2, 2021

(87) PCT Pub. No.: WO2020/064675
PCT Pub. Date: Apr. 2, 2020

(65) Prior Publication Data
US 2021/0299971 A1 Sep. 30, 2021

(30) Foreign Application Priority Data
Sep. 25, 2018 (EP) ...................................... 18196536

(51) Int. Cl.
*B29C 65/00* (2006.01)
*B29C 65/38* (2006.01)
(Continued)

(52) U.S. Cl.
CPC ................. *B29C 65/38* (2013.01); *A61J 1/10* (2013.01); *B29C 65/224* (2013.01);
(Continued)

(58) Field of Classification Search
CPC ...... A61J 1/10; B29C 65/224; B29C 66/1122; B29C 66/24244; B29C 66/244;
(Continued)

(56) References Cited

U.S. PATENT DOCUMENTS 9,308,686 B2 * 4/2016 Khan .................... B23K 20/127

FOREIGN PATENT DOCUMENTS

DE 68913038 T2 9/1994
EP 0911141 A2 4/1999
(Continued)

*Primary Examiner* — James D Sells
(74) *Attorney, Agent, or Firm* — Occhiuti & Rohlicek LLP

(57) ABSTRACT

The invention relates to a welding tool and to a method for pulse welding of plastic films for medical packs formed as bags. In general, the invention provides that the film material which is plastified during welding and thus free-flowing is specifically displaced into a deepened, edge-side inner region of the sealing surface by increasing the sealing surface area. The film material accumulated in the recess leads to an increase in the film thickness in the inner region (25i) of the weld seam (6, 7, 8). As a result, the mechanical stability of the medical pack formed as a bag can be improved.

24 Claims, 16 Drawing Sheets

(51) Int. Cl.
*A61J 1/10* (2006.01)
*B29C 65/22* (2006.01)

(52) U.S. Cl.
CPC ........ *B29C 66/1122* (2013.01); *B29C 66/244* (2013.01); *B29C 66/24244* (2013.01); *B29C 66/346* (2013.01); *B29C 66/43* (2013.01); *B29C 66/53263* (2013.01); *B29C 66/71* (2013.01); *B29C 66/723* (2013.01); *B29C 66/7352* (2013.01); *B29C 66/73921* (2013.01); *B29C 66/8122* (2013.01); *B29C 66/81261* (2013.01); *B29C 66/81427* (2013.01); *B29C 66/81431* (2013.01); *B29C 66/81811* (2013.01); *B29C 66/81871* (2013.01); *B29C 66/8322* (2013.01); *B29C 66/8511* (2013.01); *B29C 66/919* (2013.01); *B29C 66/949* (2013.01)

(58) Field of Classification Search
CPC . B29C 66/346; B29C 66/43; B29C 66/53263; B29C 66/71; B29C 66/723; B29C 66/7352; B29C 66/73921; B29C 66/8122; B29C 66/81261; B29C 66/81427; B29C 66/81431; B29C 66/81811; B29C 66/81871; B29C 66/8322; B29C 66/8511; B29C 66/919; B29C 66/949
USPC ........................................................ 604/408
See application file for complete search history.

(56) References Cited

FOREIGN PATENT DOCUMENTS

| | | |
|---|---|---|
| EP | 1605891 A1 | 12/2005 |
| JP | S63106440 U | 7/1988 |
| JP | S63249633 A | 10/1988 |
| JP | H0436552 B2 | 6/1992 |
| JP | H04242545 A | 8/1992 |
| JP | 2800904 B2 | 9/1998 |
| JP | 2004187948 A | 7/2004 |
| JP | 2005279108 A | 10/2005 |
| JP | 2011177443 A | 9/2011 |
| JP | 2014083162 A | 5/2014 |
| JP | 6091156 B2 | 3/2017 |
| WO | 2018172554 A1 | 9/2018 |

\* cited by examiner

Detail A

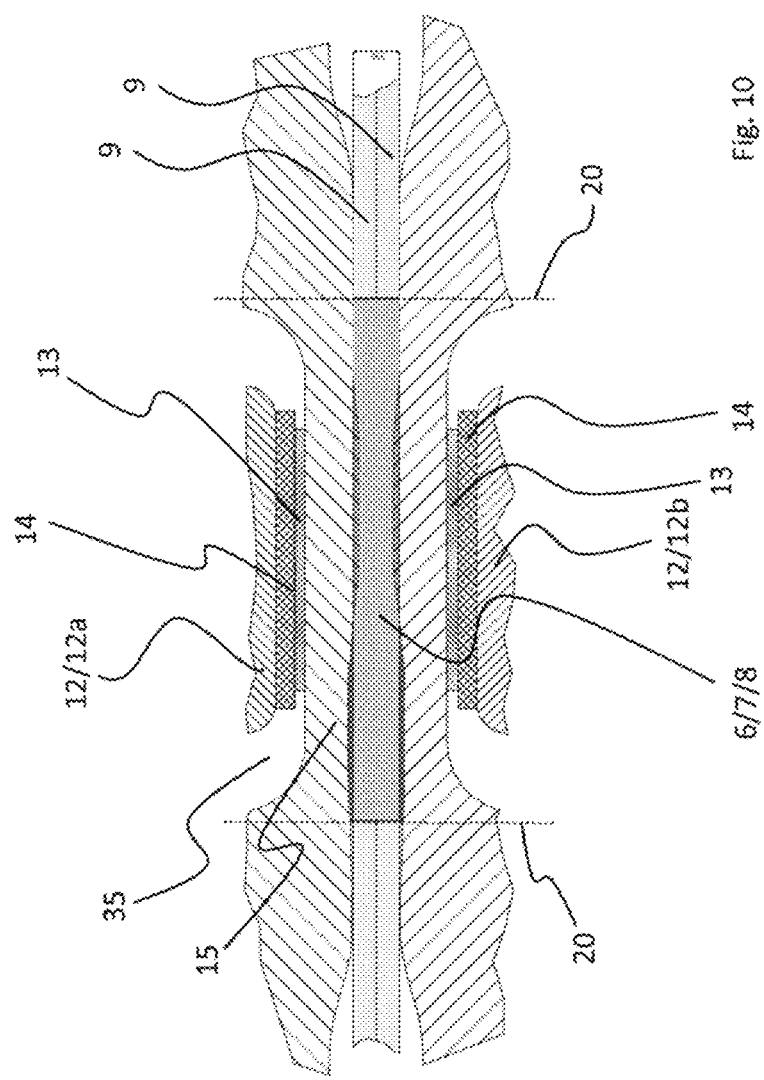

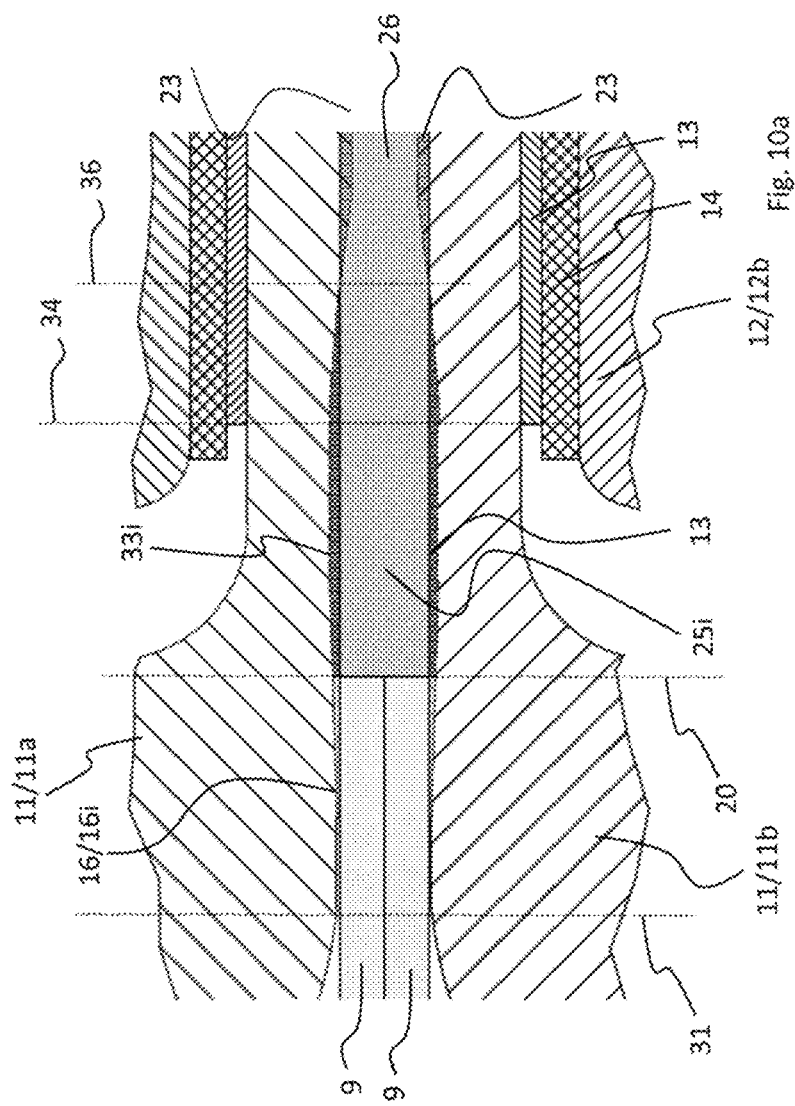

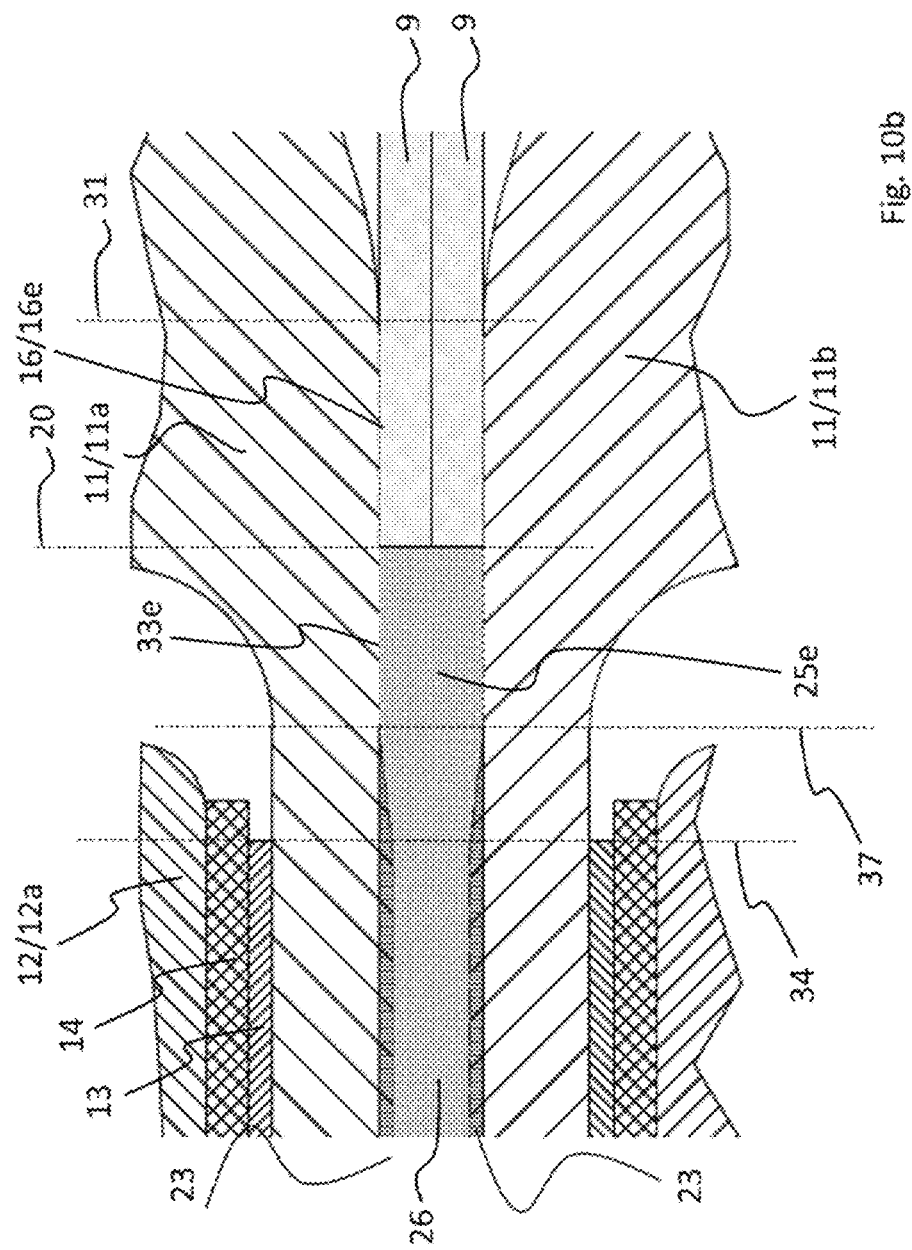

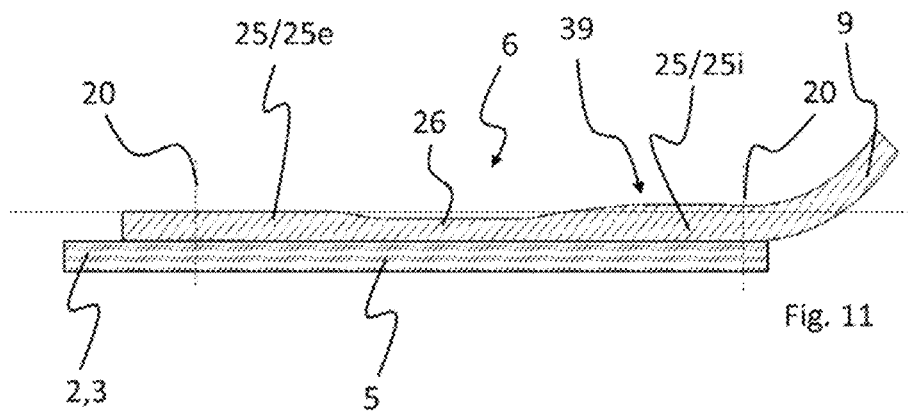
Fig. 11
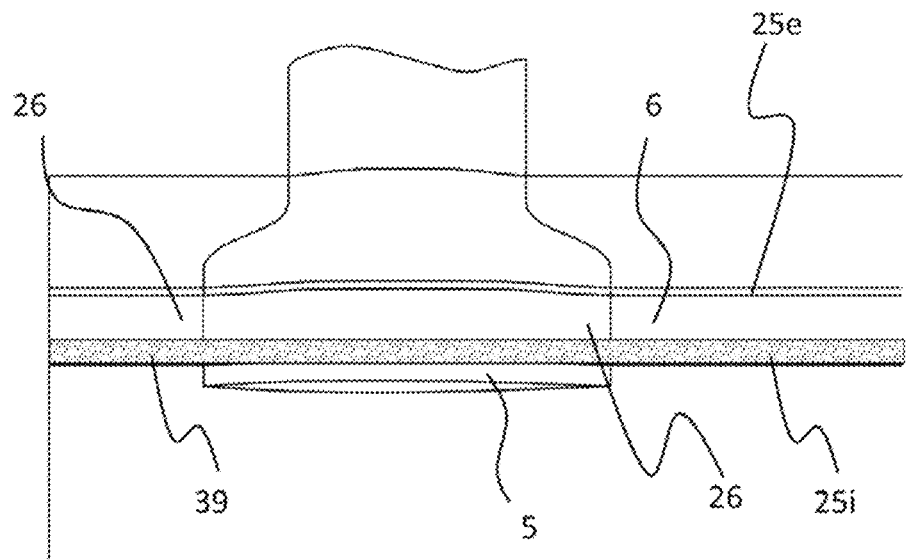
Fig. 11.a

CONTOUR-FORMING WELDING TOOL FOR PULSE WELDING AND CONTOUR-FORMING PULSE WELDING METHOD FOR A MEDICAL PACK FORMED AS A BAG

CROSS-REFERENCE TO RELATED APPLICATIONS

This application is a national phase under 35 U.S.C. 371 of International Application No. PCT/EP2019/075616 filed on Sep. 24, 2019, which claims the benefit of the Sep. 25, 2018 priority date of European Application No. 18196536.9, the contents of all of which are hereby incorporated by reference in their entirety.

FIELD OF THE INVENTION

The invention relates to a welding tool for pulse welding plastic films for medical packs formed as bags. The invention also relates to a pulse welding method using the mentioned welding tool for pulse welding. The invention further relates to a medical pack formed as a bag which is manufactured using the method according to the invention.

BACKGROUND OF THE INVENTION

Medical bags consisting of welded film are known. For example, polyolefin films are used to manufacture such medical packs.

The published patent application EP 0 911 141 A2 (Fresenius Medical Care Deutschland GmbH) shows a device and a method for welding films for the purposes of manufacturing a medical pack. According to the teaching of this document, the welding jaws comprise a heated region and an adjoining cooled region. The welding jaws are pressed onto the film during the welding process. Due to the adjoining cooled region, the welding jaws always rest on a region of non-plasticized film during this welding process such that the welding jaws are kept apart from one another by the film itself. In this way, material of the weld seam is prevented from being displaced towards the sides.

This means that the films in the region of the weld seams have substantially the same material thickness as the total thickness of the adjoining overlapping films.

It is also known to weld a port for withdrawing or for supplying liquids into the weld seam for the manufacture of medical packs formed as bags. A port is a connection system to withdraw or supply liquids. Such a port can for example be provided by a hose section or by an injection-molded component. A port of this type can, to this end, for example comprise a so-called weld-in shuttle. A weld-in shuttle is for example shown in the patent document EP 1 605 891 B1 (Fresenius Kabi Deutschland GmbH).

OBJECT OF THE INVENTION

The object underlying the invention is to provide a welding tool and a welding method and a medical pack manufactured using a welding method according to the invention which permit higher shape tolerances of the materials used, but at the same time the positive pack properties are retained or even improved. In this case, the stability of the pack should in particular be improved in fall tests.

SUMMARY OF THE INVENTION

The object of the invention is achieved by a welding tool, by a method of welding a film and by a medical pack formed as a bag according to the independent claims.

Preferred embodiments of the invention can be inferred from subject matter of the dependent claims, the description and the drawings.

In general, the invention provides that the film material which is plasticized during welding and thus free-flowing is specifically shifted or displaced into an inner, edge-side recess of the sealing surface by increasing the sealing surface area. The displaced film material is so to speak accumulated or collected there. After the film material has solidified, this results in a thickening or strengthening of the film in the region of the inner weld seam. The contour of the film is increased in a cross-section. The displaced film material can also balance out shape and/or dimensional tolerances. In particular, the film material can also be displaced laterally along the weld seam through the increase.

The invention provides a welding tool for pulse welding a film made of plastic of a preferably medical pack. The welding tool comprises a welding jaw with a sealing strip, which extends along the welding jaw and can be pressed onto the film. The sealing strip, in order to form a weld seam, comprises a heatable sealing surface in order to plasticize plastic material of the film adjoining the sealing surface. The welding tool is in particular characterized in that the sealing surface has a raised portion and an inner, edge-side recess.

The invention will be described in detail by a welding tool for pulse welding a film made of plastic of a preferably medical pack, comprising a welding jaw with a sealing strip, which extends along the welding jaw and can be pressed onto the film, with the sealing strip, in order to form a weld seam, comprising a heatable sealing surface in order to plasticize plastic material of the film at least adjoining the sealing surface and, on the edge side in relation to the sealing surface, having an adjoining, inner clamping region and an adjoining, outer clamping region for clamping the film during welding of the film, characterized in that the sealing surface has a raised portion preferably arranged in a middle region of the sealing surface, in particular to shift plasticized plastic material of the film, with an edge-side inner region of the sealing surface adjoining the inner clamping region being arranged recessed at least in sections both with respect to the inner clamping region and with respect to the raised portion.

The middle region of the sealing surface is preferably located between the inner region of the sealing surface and an outer region of the sealing surface.

Through the raised portion and the inner, edge-side recess in the sealing surface, the plasticized plastic material of the film can be shifted specifically into the inner, edge-side region of the manufactured weld seam and accumulated there. As a result, the film thickness in this region is increased. The plastic material can in particular also be shifted laterally along the weld seam. The raised portion and/or the recess can be provided by profiling the sealing surface. The raised portion can for example be provided by a structure, which is convex at least in sections, or by a kind of step. The recess, which is also designated as a recessed inner region, can for example be provided by a structure, which is concave at least in sections, or by a kind of step.

The sealing strip has, on the edge side in relation to the sealing surface, the adjoining inner clamping region and the adjoining outer clamping region, for clamping the film during welding of the film. As a result, a cavity is formed in the welding tool during the welding.

The inner clamping region and the outer clamping region are preferably provided during the welding with a temperature below a plasticization temperature of the film to be welded. As a result, the plastic material, which is plasticized in the region of the sealing surface, cannot flow or cannot substantially flow into the clamping region. A virtually completely closed cavity is formed as a result.

In particular by combining the clamping region and the profiling, in particular configured by the raised portion and the recess, a free, directed flow of material is enabled. The flow of material takes place in particular transversely (obliquely) to the weld seam into the recess in order to specifically increase the film thickness and the inner region of the weld seam and, if applicable, also laterally (along the weld seam) in order to balance out e.g. manufacturing tolerances of the components (film, port, . . . ).

The welding tool comprises at least one, preferably two welding jaws, which can be pressed onto a film. The sealing surface extends over the welding jaw along the longitudinal axis of the welding jaw. The sealing surface can be heated in such a manner so as to heat and melt a plastic material of the film to be welded, which adjoins the sealing surface.

The raised portion is a structural raised portion, which protrudes from the top surface of the sealing surface. In one embodiment, the raised portion is provided by a plateau, which protrudes from the top surface of the sealing surface. The plateau can be configured completely flat or flat in sections, inclined and/or curved, in particular in a cross-sectional view.

The raised portion, in particular the plateau, is provided in one configuration of the invention as a strip-shaped contour on the sealing surface. The raised portion in particular occupies 20% to 60%, preferably 30% to 50% of the width of the sealing surface. The plateau is in particular provided with a width of between 1.5 and 2.5 mm, preferably between 1.8 and 2.2 mm. The raised portion is in particular provided with a height of between 10 and 100 µm, preferably between 20 and 60 µm. The corresponding values then emerge for the region of the weld seam, which is reduced in thickness. The region of the weld seam, which is reduced in thickness, in particular occupies 20% to 60%, preferably 30% to 50% of the width of the weld seam. The region of the weld seam, which is reduced in thickness, is in particular manufactured with a width of between 1.5 and 2.5 mm, preferably between 1.8 and 2.2 mm.

The recessed inner region of the sealing surface, in particular the recess, is provided in one configuration of the invention as a strip-shaped contour in the sealing surface. The recessed inner region in particular occupies 30 to 70%, preferably 40 to 60% of the width of the weld seam. The recessed inner region is in particular provided with a width of between 2 and 3 mm, preferably between 2.4 and 2.8 mm. The recessed inner region is in particular provided with a depth of between 10 and 100 µm, preferably between 20 and 60 µm. The corresponding values then emerge for the inner region of the weld seam, which is increased in thickness. The region of the weld seam, which is increased in thickness, in particular occupies 30 to 70%, preferably 40 to 60% of the width of the weld seam. The region of the weld seam, which is increased in thickness, is in particular manufactured with a width of between 2 and 3 mm, preferably between 2.4 and 2.8 mm.

According to the invention, the edge-side inner region of the sealing surface is arranged recessed with respect to the raised portion and with respect to the inner clamping region. The inner region of the sealing surface is in particular the region of the sealing surface which produces the edge-side inner region of the weld seam. The inner region of the weld seam is the region, which adjoins the interior of the bag. As a result, a weld seam can be manufactured, which has a greater thickness on its inner side. When welding two films, the thickness of the inner weld seam is at least in sections greater than the sum of the two individual film thicknesses. Such a weld seam is more stably designed as a result. A bag filled in this manner has a higher strength when pressure is applied.

In particular, an edge-side outer region of the sealing surface can be arranged recessed with respect to the raised portion and with respect to the outer clamping region. The outer region of the sealing surface is in particular the region of the sealing surface which produces the edge-side outer region of the weld seam. The outer region of the weld seam is the region, which adjoins the exterior or the environment of the bag. As a result, a weld seam can be manufactured which has on its inner side and on its outer side an increased thickness and therefore is more stably designed overall.

In one configuration, the edge-side outer region of the sealing surface adjoining the outer clamping region is arranged raised with respect to the inner region of the sealing surface adjoining the inner clamping region. In this variant, the formed weld seam is thicker on its inner side than on its outer side. In this case, the edge-side outer region of the sealing surface can in particular substantially be at a height of the adjoining outer clamping region. As a result, the outer edge-side weld seam region can be manufactured with a thickness which corresponds substantially to the sum of the film thickness.

The outer region of the sealing surface extends in one embodiment over a width of 5% to 30%, preferably of 10% to 20%, of the width of the sealing surface. The outer region of the sealing surface is in particular provided with a width of between 0.2 and 1.5 mm, preferably between 0.5 and 1.0 mm. The corresponding values then emerge for the outer region of the weld seam. The outer region of the weld seam extends in one embodiment over a width of 5% to 30%, preferably of 10% to 20%, of the width of the weld seam. The outer region of the weld seam is in particular provided with a width of between 0.2 and 1.2 mm, preferably between 0.4 and 0.9 mm.

The plateau lies in the middle region of the sealing surface. The plateau can be arranged for example roughly centrally in the sealing surface. It is preferably not arranged symmetrically in the sealing strip. In one configuration, the plateau is arranged offset in the direction of the outer region of the sealing surface. In the cross-section, the longitudinal axis of the raised portion is preferably also arranged laterally offset outwards with respect to the longitudinal axis of the heating conductor. The raised portion in one embodiment ends in the direction of the inner side in the region of the heating conductor and extends in the direction of the outer side beyond the heating conductor. As a result, sufficient heat input can be ensured in this region of the sealing surface.

The plateau or the raised portion preferably adjoins, on its inner side, the recessed inner region of the sealing surface and in this case merges, preferably directly, in the recessed region, in particular without an intermediate step.

In particular in a combination with the outer region of the sealing surface, which is at the same height as the outer clamping region of the sealing strip, and the inner region of the sealing surface, which is arranged recessed with respect to the raised portion and the outer clamping region of the sealing strip, the raised portion represents an asymmetric step in an upper side of the sealing strip. Since the raised portion has a greater height in the direction of the inner sealing surface than in the direction of the outer sealing surface.

The raised portion in the sealing surface serves to shift the softened plastic material. This plastic material is in particular shifted into the adjacent inner recessed region of the sealing surface. A displacement volume VV can therefore be assigned to the raised portion in the cavity formed. Analogously, a receiving volume AV can also be assigned to the recess or the recessed inner region of the sealing surface. According to one embodiment, the displacement volume VV of raised portion is greater than the receiving volume AV of the recessed inner region. As a result, a sufficient quantity of material can be provided to fill the recessed inner region and possibly any present imperfections in the film and/or of a port. Preferably 1.1 AV<VV<1.5 AV.

The recessed inner region represents a recess. The inner region of the sealing surface, in one preferred exemplary embodiment of the invention, is arranged not only in sections but rather arranged fully recessed with respect to the raised portion and the inner clamping region. The recessed inner region of the sealing surface is preferably designed as a trench which extends along the sealing surface.

The recessed inner region of the sealing surface starts in one embodiment on its outer side in the region of the heating conductor and extends towards the inner side beyond the heating conductor (in a cross-sectional view). As a result, sufficient heat input can be ensured in this inner region of the sealing surface. This means, as a result, that the inner end of the weld seam is located in the recessed and therefore in the strengthened region. The longitudinal axis of the recessed inner region of the sealing surface is preferably arranged laterally offset inwards with respect to the longitudinal axis of the heating conductor.

In a further embodiment, the recessed inner region of the sealing surface has in sections a depth, which decreases in the direction of the inner clamping region, and merges, preferably directly, into the inner clamping region. In an alternative or supplementary embodiment, the recessed inner region of the sealing surface has a depth, which decreases in the direction of the raised portion in sections, and merges, preferably directly, into the raised portion.

According to a further embodiment of the invention, the welding tool comprises a membrane, which bulges when heated and which comprises at least the sealing surface.

Bulging when heated is understood as the sealing surface bulging in the unloaded state, i.e. when it is not held back by a counterforce, which is for example present due to the material of the weld seam, which cannot be displaced.

In the case of a welding process, the membrane therefore bulges in particular when material flows in the weld seam and in this case can in particular balance out cavities due to manufacture-related shape tolerances.

The block, part of which is preferably the membrane, is according to one embodiment of the invention manufactured from a material with a low thermal linear expansion, in particular of an iron-nickel alloy.

At least the part of the block, which comprises the sealing strip or the membrane, preferably consists of a material with a thermal linear expansion coefficient $\alpha$ at 20 to 300° C. of less than 10, preferably of less than 5 and particularly preferably of less than $2*10^{-6}$/K.

The welding tool further comprises according to one embodiment of the invention a cooling element, which is in particular cooled with liquid. An electric heating conductor is placed on the cooling element. An upper part with the sealing strip, which extends along the heating conductor, is preferably placed on the cooling element.

The cooling element in particular comprises a projection, which protrudes into the block with the sealing strip or with the membrane and/or on which the heating conductor is placed. Thus, the heating conductor is arranged directly adjoining the sealing strip or the membrane and is preferably in direct contact with the sealing strip or with the membrane.

To this end, an electric insulation is present between the heating conductor and the sealing strip or the membrane. In particular, it is provided that the sealing strip or the membrane, preferably the entire underside of the block, is provided with an insulating coating, in particular with an electrically insulating oxide layer and/or ceramic layer, such as for example a metal or metalloid, in particular silicon oxide layer. The insulating layer preferably has a thickness below 50 μm, particularly preferably below 10 μm. It is in particular a layer precipitated by means of a plasma process.

In the case of a further embodiment of the invention, the welding tool comprises an upper part with at least one depression. This depression is designed to receive the weld-in section, for example the weld-in shuttle, of a port. In this case, the welding tool is designed such that the sealing surface is hotter or can be more strongly heated in the region of the weld-in section than in an adjoining region of the sealing surface in which two opposing films are welded together.

During operation of the heating conductor, the sealing surface is thus heated more strongly in the region of the weld-in section of a port, in particular at least temporarily by at least 20° C. Since, in the region of the port, in particular in its weld-in section, the welding jaw and therefore the sealing surface, not separated directly and only by the two films, is located opposite the other sealing surface of the opposing welding jaw, a higher energy input is advantageous in this region in order to thus plasticize the material in this region approximately equally as quickly. As a result, a single-stage manufacturing process is enabled. The port can be welded into the weld seam at the same time during the manufacture of the weld seam.

To achieve this, different technical solutions are provided.

According to one embodiment, the heating conductor itself can be tapered in its cross-section in the region of the depression such that said heating conductor is hotter in the region in which the weld-in shuttle is supposed to be connected to the film.

According to a further embodiment, the welding jaw, in particular the sealing strip or the membrane of the welding jaw, can be designed somewhat thinner in the region of the depressions for the port such that improved heat transfer from the heating conductor to the sealing surface is present here.

According to a further embodiment, the following is provided: in order to heat the sealing surface in the port region more strongly, the thickness of an insulating layer, in particular a silicon layer, via which the heating conductor is connected to a cooling element, is selected so as to be somewhat greater in this region. Thus, the heating conductor is cooled less well in the region of the depressions for the port, which results in a higher temperature when heating.

The invention also relates to the use of the previously described welding tool for manufacturing a medical pack formed as a bag.

The previously described welding tool can also preferably be used in the method described below. Therefore, the aforementioned features of the welding tool can also be features of the welding method described below. The features of the welding method mentioned below can also be features of the previously described welding tool.

In general, the invention also relates to a method for welding a film made of plastic. In particular, the invention relates to a pulse welding method for welding the film of a medical pack. The pulse welding is a part of the manufacturing process of a pharmaceutical product. Therefore, the previously mentioned method for filling can also be described as the method for manufacturing a pharmaceutical product.

The present invention is described in detail by a pulse welding method with a welding tool for pulse welding a film made of plastic of a preferably medical pack. In this case, the previously described welding tool is in particular used in the method. In doing so, a welding jaw of the welding tool is pressed with a heatable sealing surface onto the film to form a weld seam such that a cavity is formed in the welding tool during the welding, by clamping the film on the edge side in relation to the sealing surface during the welding process through a preferably inner and outer clamping region which is cooler than the sealing surface and extends on the edge side to the sealing surface and by plasticized plastic material of the film being shifted by a raised portion of the sealing surface, which is preferably arranged in a middle region, preferably at least transversely to the sealing surface into an edge-side inner region of the sealing surface, which is recessed at least in sections and adjoins the clamping region, such that the film thickness is increased in the edge-side inner region of the weld seam. The inner region of the sealing surface is preferably arranged recessed at least in sections both with respect to the inner clamping region and the raised portion.

In particular by combining the clamping region and the contour of the sealing surface, in particular the raised portion and the recess, a free flow of material directed transversely (obliquely to the weld seam) and, possibly, laterally (along the weld seam) is enabled. As a result, one the one hand, the film thickness can be increased in the inner region of the weld seam and therefore the film can be strengthened in this inner region. On the other hand, manufacturing tolerances of the components (film, port, . . . ) can also be balanced out, in particular produced without an uncontrolled expulsion of material. In particular, all components are completely welded until the entirety of all tolerance deviations is smaller than the displacement volume of the raised portion.

The clamping region is cooler or cool such that it is provided with a temperature which is below the plasticization temperature of the film to be welded. In particular, the temperature of the clamping during the welding is at maximum roughly 20° C. above room temperature. To this end, the welding jaw of the welding tool is preferably cooled by means of a cooling element continuously with a fluid, for example water and the sealing surface is heated by means of the heating conductor in pulses in a time limited manner.

The film thickness is the thickness of the film(s) with which the film(s) is/are provided for welding. The film thickness in the edge-side outer region of the weld seam is retained in one embodiment, preferably substantially when it deviates by at most ±10% with respect to the thickness of the film(s), with which the film(s) has/have been provided.

During welding, a welding jaw is pressed with a heatable sealing surface on the film, with the film being clamping on the edge side in relation to the sealing surface during the welding process in a clamping region of the welding jaw.

In one embodiment, at least one weld-in section of a port is welded in the weld seam preferably at the same time. The weld-in section of the port is preferably provided by a weld-in shuttle. The weld-in section can, however, also be provided by a kind of tube or hose section. The sealing surface is preferably more strongly heated in the region in which the port is welded in than in an adjoining region of the sealing surface in which two films are welded together.

During the welding process, a force is exerted on the film through surface pressure preferably both from the sealing surface and from a clamping region adjoining the sealing surface on the edge side.

The clamping jaw is in particular pressed strongly such that at least at the beginning of the welding process a force averaged over the sealing surface and the clamping region of 0.05 to 5, preferably of 0.1 to 1 N/mm$^2$ results.

By clamping the film in the clamping region, the film is a space holder for the welding jaws during the welding process. The tool is held apart in the clamping region by the films such that inside the weld seam, for example between two opposing sealing surfaces or between the sealing surface and the weld-in shuttle of the port, a closed cavity is formed, which is to be found by comparison in an injection molding process. This leads to the plasticized, in particular molten plastic material not being pressed in a notable manner adjacent to the weld seam.

The sealing surface is firstly heated during a welding process such that the plastic material adjoining the sealing surface is plasticized in order to enter into a materially-bonded connection. The heating is then turned off and as soon as the plastic material has solidified, the welding jaw is lifted. Plasticization of the plastic material is understood as heating such that the plastic at least begins to pass into a molten state such that it can enter into a materially-bonded connection.

According to one embodiment of the invention, a higher surface pressure is exerted in the region of the sealing surface than in the clamping region when heating the sealing surface. As a result, the displacement or flow of the plasticized film material can be supported.

According to this embodiment of the invention, during the welding process, surface pressure is not exerted with substantially the same force per area both over the clamping region and over the sealing surface, rather a greater force per area is exerted in the region of the sealing surface. The force in the region of the sealing surface is preferably at least temporarily and at least in sections 1.5 times greater than in the adjoining clamping region.

In this way, on the one hand, a closed cavity is formed in the region of the weld seam.

At the same time, on the other hand, inside this closed cavity, a pressure is built up in a molten material due to the greater surface pressure such that the molten material can flow, if a volume is present for this purpose. Such a volume is in particular present through the recess in the inner region of the sealing surface. Such a volume can for example also be present through manufacture-related tolerances. Such tolerances can in particular be present on the outer side of the weld-in shuttle of a port. They are thus filled in an improved manner by the material of the film to be welded. A welding method can thus be easily provided which permits higher manufacturing tolerances.

The surface pressure is converted by the liquefaction of the plastic material into a pressure in the cavity, which allows molten material to flow into the cavities, in particular transversely (obliquely to the weld seam length) and possibly laterally (in the direction of the weld seam length).

Films can e.g. be connected together by the invention. Weld-in sections, for example weld-in shuttles, of a port can also be welded between two films, with the films passing into a molten state and being connected to the weld-in section in a materially-bonded manner. In particular due to the greater force per area in the region of the sealing surface, i.e. in the region of the weld seam being formed, possible sink points can be filled.

The sealing surface is in particular designed as a heatable linear or strip-shaped surface which is temporarily heated during a welding cycle. The heating of the sealing surface can in particular take place with a resistance-heated heating conductor.

To weld the weld-in section, preferably the weld-in shuttle, of a port, the sealing surface can have a depression in addition to the adjoining clamping region. The shape of the depression is in this case adapted to the shape of the weld-in section of a port. Its shape is adapted in one embodiment of the invention to a weld-in shuttle tapering sharply at the edges. The weld-in shuttle is a weld-in section formed in a shuttle shape and can therefore be designated in short as a shuttle-shaped weld-in section.

According to one embodiment of the invention, the greater force per area in the region of the sealing surface is exerted by a bulging membrane which comprises the sealing surface.

A membrane is understood as a section of the welding jaw preferably formed with a thin wall, in particular an upper part of the welding jaw.

The membrane is preferably fixed at the edge side. As soon as the membrane is heated during a welding cycle, it expands and bulges at least when no counter force is opposing, forwards, i.e. in the direction of the film, on which the pressure is exerted. The membrane preferably rests with its underside, in particular on a heating wire. Thus, bulging is possibly only forwards.

Thus, the force per area can be easily increased in the region of the sealing surface and therefore the pressure inside the closed cavity, in which the weld seam is located or formed.

The method according to the invention is in particular a pulse welding method. In one embodiment, the cycle time, i.e. the time from placement of the welding tool, heating of the sealing surface, cooling and lifting of the welding tool, is less than 10, preferably less than 8 and particularly preferably less than 5 seconds.

The membrane is in particular formed such that it bulges in the unloaded state, i.e. without counterforce due to an attached film, at least 10 µm, preferably at least 15 µm in the direction of the film.

The membrane is preferably part of the upper part of a welding jaw and is preferably formed integrally with an adjoining region of the upper part.

The upper part is preferably formed as a block, which comprises the membrane. The membrane is provided as a result by the block being thinned out in the region of the membrane.

During a welding process, only the sealing surface, which is part of the membrane, but not the adjoining clamping region, is heated such that the film in contact is plasticized. Due to this, the block does not expand or at least expands less such that the membrane is clamped in the transition region to the block and bulges since the block does not follow the expansion of the membrane.

In the case of a further embodiment of the invention, a welding jaw with a sealing surface is used, which has at least one raised portion, preferably a plateau, protruding from a surface of the sealing surface, and a recess.

The sealing surface, whose height in the outer edge-side region can match the height of the outer clamping region, can thus have a thickened region in the form of a plateau and a thinned region in the form of a recess.

The raised portion, preferably the plateau, is preferably formed as a plate-shaped contour or protrusion, which extends in the middle region along the main extension direction of the sealing surface. The raised portion arranged in the middle region of the sealing surface lies between the inner region of the sealing surface, which joins in the direction of the bag interior, and the outer region of the sealing surface, which joins in the direction of the environment of the bag.

The surface pressure in the region of the sealing surface is also increased by the plateau. Furthermore, material, which is in the molten state, can be set into motion by the plateau and in doing so fill possible cavities, such as e.g. the recess.

The membrane has, in order to be sufficiently bulged, but also in order to not be formed so thin that there is the danger of tearing, has a thickness of 100 to 1500 µm, preferably of 300 to 600 µm, in the case of one embodiment of the invention.

According to one embodiment of the invention, a multi-layered film, in particular a multi-layered polyolefin film, such as for example a polypropylene or polyethylene film, is welded. Such multi-layered films have improved properties in regard to their tear resistance. It has been found that through the method according to the invention, in particular even multi-layered film can be securely joined.

The film used for the method preferably has a thickness of 100 to 500 µm, particularly preferably of 150 to 300 µm.

Irrespective of whether a single-layered or multi-layered film is used, according to one embodiment of the invention, it is provided that the entire film is plasticized during the welding method. In particular, all layers of a multi-layered film can be plasticized during the welding method. In this case, the entire material in the region of the weld seam is transferred to a molten state, with a closed volume being produced in the region of the weld seam by the lateral clamping of the film in the clamping region. In this case, there does not have to be mixing of the layers of the film. The invention may, however, also refer to the use of a multi-layered film, which has a thin layer made of a material, which melts at a lower temperature, which serves as an adhesive layer. In the case of this configuration, all the material in the region of the weld seam does not have to be plasticized.

The invention further relates to a medical pack formed as a bag, which in particular can be manufactured with the previously described method and in particular using the previously described tool. The aforementioned features of the welding tool and/or the welding method can therefore also be reflected in the features of the medical pack described below and formed as a bag.

The bag comprises films welded together. According to the invention, the bag comprises at least one weld seam, which at least in sections has a region which is thinned out with respect to an adjoining neighboring region or is reduced in thickness. The neighboring region is, on the one hand, provided by an edge-side inner region of the weld seam. This edge-side inner region of the weld seam is the region of the weld seam, which adjoins the interior of the bag. In the case of a filled bag, this region of the weld seam adjoins for example the liquid contained in the bag. In this case, the edge-side inner region of the weld seam has a thickness, which is preferably at least in sections greater than a thickness of the provided film for the case where a film and a port are welded together. For the case where two films are welded together, the weld seam has a thickness which is greater than a total thickness of the two films provided.

The invention can be described in one configuration by a medical pack formed as a bag, which comprises films welded together, with the bag comprising at least one weld seam, which has at least in sections a region, which is reduced in thickness with respect to an adjoining neighboring region of the weld seam, with the neighboring region being provided by an edge-side inner region of the weld seam and by an edge-side outer region of the weld seam and the edge-side inner region of the weld seam having a thickness $D_I$, which is at least in sections greater than a total thickness of the films welded together, with the total thickness being the sum of the individual thicknesses D of the films, with the thickness $D_I$ of the weld seam in the edge-side inner region at least in sections being $2D<D_I<2.5 D$ and a thickness $D_P$ of the weld seam in the region of reduced thickness at least in sections being $0.5\ 2D<D_P<2D$ and a thickness $D_E$ of the weld seam in the outer region at least in sections being $0.8\ 2D<D_E<1.2\ 2D$.

In one embodiment, the neighboring region can also still be provided by an edge-side outer region of the weld seam. The outer region of the weld seam describes the region, which adjoins the outer environment. The edge-side outer region of the weld seam preferably has a thickness, which corresponds substantially to a thickness of the film or to a total thickness of the films.

The thickness of the film describes the film thickness with which the film has been provided. The total thickness describes the sum of the film thicknesses of the two provided films which are welded together.

The thickness of the weld seam corresponds, preferably substantially, to the thickness of the film when it deviates by at most ±10%. The thickness of the weld seam corresponds, preferably substantially, to the total thickness of the two films when it deviates by at most ±10%.

This thinned-out region is in particular formed as an impression of the raised portion described above, for example of the plateau described at the outset. In this region, the weld seam is reduced in thickness due to the pressure produced by the raised portion, e.g. by the plateau.

The region, which is thinned out or reduced in thickness, extends in particular over a width of 20% to 60%, preferably of 30% to 50%, of the width of the weld seam. The thinned-out region can for example extend in a strip-shaped manner along a region of the weld seam. It can in particular form a strip along a middle region of the weld seam.

In particular, the thickness $D_P$ of the weld seam in the region of reduced thickness, preferably at least in sections, is smaller than a sum of the individual thicknesses D of the films. In one embodiment of the invention, the thickness $D_P$ of the weld seam in the region of reduced thickness, preferably at least in sections, is $0.5\ 2D<D_P<2D$, preferably $0.6\ 2D<D_P<0.9\ 2D$, particularly preferably $0.7\ 2D<D_P<0.8\ 2D$. Insofar as two films of different film thickness D1 and D2 are intended to be welded together, 2D is replaced with the sum D1+D2.

The thickened region is in particular formed as an impression of the previously described recess. In this region, the weld seam is increased in thickness due to the material displaced by the raised portion. The region, which is thickened or increased in thickness, extends in particular over a width of 30% to 70%, preferably of 40% to 60%, of the width of the weld seam. The thickened region can for example extend in a strip-shaped manner along a region of the weld seam. It can in particular form a strip along an inner, preferably edge-side, region of the weld seam. In one configuration of the invention, the region, which is reduced in thickness, and the region, which is increased in thickness, run parallel to one another.

In particular, the thickness $D_I$ of the weld seam in the thickened inner region, preferably at least in sections, is greater than a sum of the individual thicknesses D of the films. In one embodiment of the invention, the thickness $D_I$ of the weld seam in the thickened region at least in sections is $2D<D_I<2.5 D$, preferably $1.1\ 2D<D_I<1.5\ 2D$, particularly preferably $1.1\ 2D<D_I<1.25\ 2D$. Insofar as two films of different film thickness D1 and D2 are intended to be welded together, 2D is replaced with the sum D1+D2.

In one embodiment, it applies in general that $D_I>D_P$ and that $D_I>D_E$ and possibly that $D_E>D_P$.

In one configuration of the weld seam, the thickened inner region of the weld seam is wider than the region, which is reduced in thickness, and/or the outer region of the weld seam. In particular, the region, which is reduced in thickness, is wider than the outer region of the weld seam.

Furthermore, the weld seam can comprise at least one welded-in port. In particular, the weld seam can comprise a port with a weld-in shuttle. The weld seam is preferably between 1 and 10 mm, particularly preferably between 3 and 7 mm wide.

A sealing strip producing the weld seam is preferably between 5 and 15 mm, particularly preferably between 6 and 12 mm wide.

A pharmaceutical product is also, to this end, in the field of the invention. It comprises an embodiment of a medical pack formed as a bag, as is described above. The bag is filled with a medical liquid, which preferably contains an active ingredient. A medical liquid is for example a liquid which is to be administered intravenously. Examples of a liquid to be administered are a saline solution, a glucose solution, a nutrient solution for parenteral nutrition, an emulsion or the like. The active ingredients can be present dissolved and/or dispersed in the liquid. The pack is preferably filled via the port. After filling, the pack is sealed in a liquid-tight manner, for example by placing a cap on the port. In addition, the pack is sterilized, preferably autoclaved, after sealing.

BRIEF DESCRIPTION OF THE DRAWINGS

The subject matter of the invention will be explained in detail below on the basis of the drawings FIG. 1 to FIG. 17 with reference to an exemplary embodiment.

FIG. 9 is a sectional view of the region of the sealing surface of the sealing strip represented in FIG. 8a.

FIG. 10 is an enlarged detail view of FIG. 2.

FIGS. 10a and 10b are detail views of FIG. 10 in which the details of the sealing strip are represented.

FIG. 11 is the section Sp/f of a weld seam in the region of the weld-in shuttle of a port (see FIG. 1), which is manufactured for example with the welding tool represented in FIG. 4.

FIG. 11a shows a detail view of the port region of a bag, which is manufactured with the welding tool represented in FIG. 11.

The steps of an exemplary embodiment of the method according to the invention will be explained with reference to the flow diagram according to FIG. 12.

DETAILED DESCRIPTIONS OF THE DRAWINGS

Figure 1:
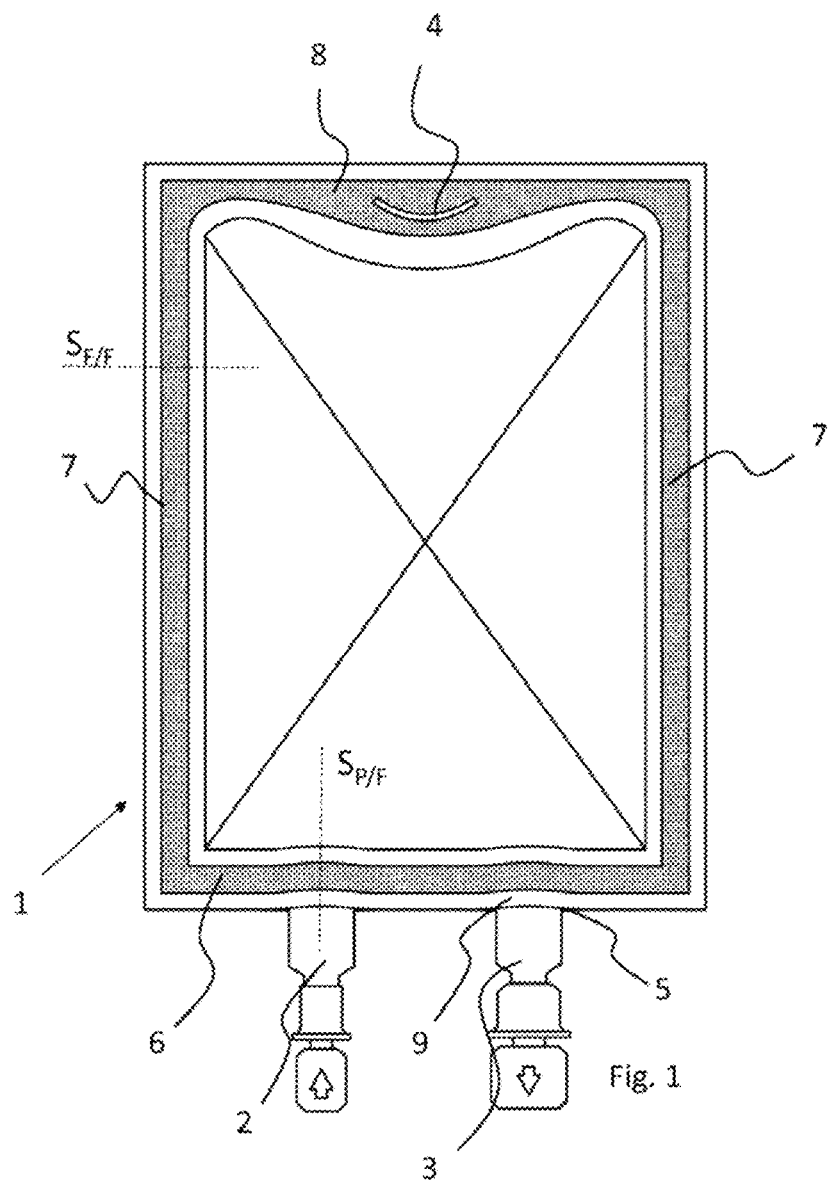
FIG. 1 is a schematic view of a medical pack according to the invention, which is formed as a bag.

FIG. 1 shows a medical pack formed as a bag 1, as can be manufactured according to the invention.

The bag 1 comprises in this exemplary embodiment two ports 2, 3, in which one port 2 is provided to supply and another port 3 is provided to withdraw liquid. The invention may also relate to bags 1, which comprises only one port 2 or 3 or a number of ports 2, 3 (not shown here). For example, a bag 1 can have one to four ports 2, 3. The bags 1 can for example be filled with a saline solution. Such bags 1 can in particular also be previously filled with a liquid, for example a solution, already containing active ingredients.

The ports 2, 3 are welded in and to this end each comprise a weld-in section 5. The examples represented here show the weld-in section 5, each in the configuration of a weld-in shuttle 5 (see also FIGS. 4, 8 and 14). The weld-in sections 5 can also be present in the form of a tube or hose section.

The weld-in shuttles 5 are welded in when welding the weld seam 6 also designated as a transverse weld seam into the bag edge and are therefore covered by the film 9, of which the bag 1 consists.

The bag 1 consists for example of a multi-layered, polyolefin-based film, in particular the bag 1 consists of a polyethylene or polypropylene film.

In addition to the transverse weld seam 6, the bag 1 is also sealed by the edge-side weld seams 7 also designated as longitudinal weld seams and by the upper transverse weld seam 8. The bag 1 also comprises a hanger 4 here in the region of the upper transverse weld seam 8.

The cross-section of a weld seam 6, 7, 8, in which two films 9 are welded together directly (without welded-in port 5), is marked with Sf/f. In contrast, the cross-section of a weld seam 6, in which a weld-in shuttle 5 of a port 2, 3 is welded into the film edge, is marked with Sp/f. With reference to the following drawings, it will be explained how the weld seams 6, 7, 8 are formed.

Figure 2:
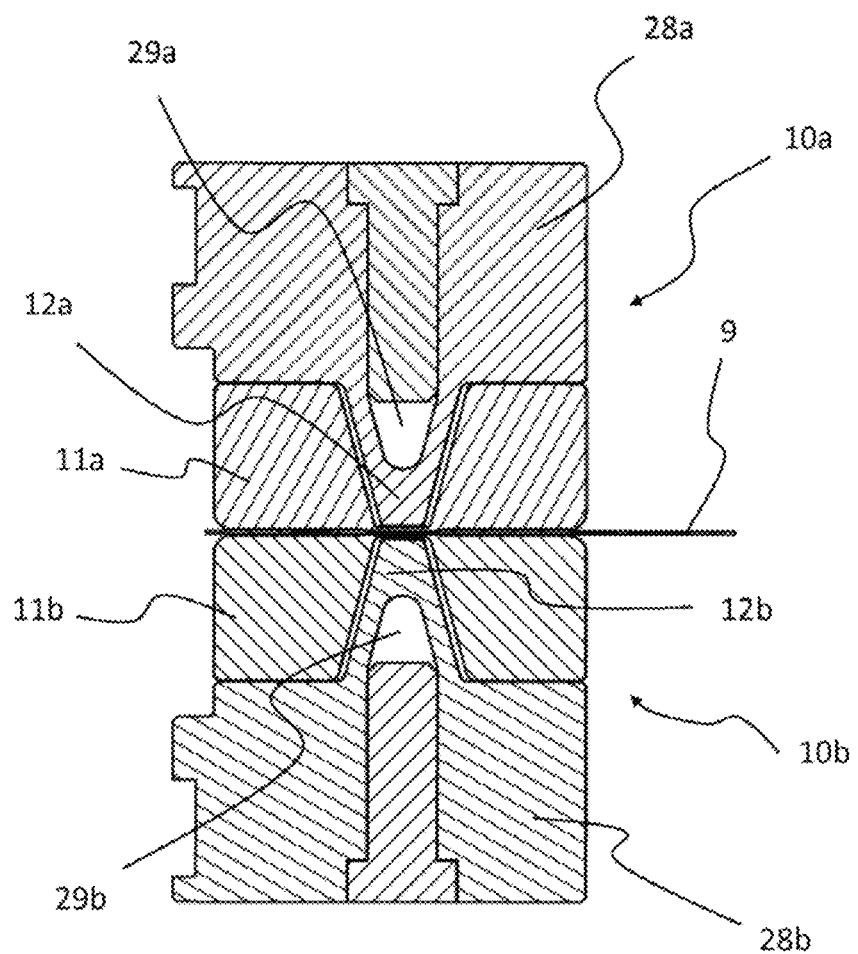
FIG. 2 is a sectional view of the welding tool.

FIG. 2 shows, in a schematic sectional view, parts of the welding tool by means of which the films 9 are welded to one another or the films 9 to the port 2, 3. In addition to the welding jaws 10a and 10b, the welding tool also comprises the mechanics, not shown here, to move the welding jaws 10a, 10b, a cooling means supply and a control electronics, amongst other things to control the heating conductor 13.

In order to weld e.g. two films 9 to one another, the welding jaws 10a and 10b are pressed onto the films 9 to form a weld seam 6, 7, 8. Each welding jaw 10a, 10b comprises in each case one cooling element 12a and 12b and an upper part 11a, 11b. The cooling elements 12a and 12b protrude into the respective upper part 11a and 11b. The mentioned upper parts 11a and 11b each comprise a sealing surface 17 and are pressed onto the films 9.

The lower part 28a, 28b of the respective welding jaw 10a, 10b each comprise a cooling channel 29a, 29b which extends along the cooling element 12a, 12b and via which the cooling element 12a, 12b is continuously cooled by cooling liquid passing through. The upper part 11a/11b sits on the lower part 28a/28b and is cooled by the lower part 28a/28b.

Figure 3:
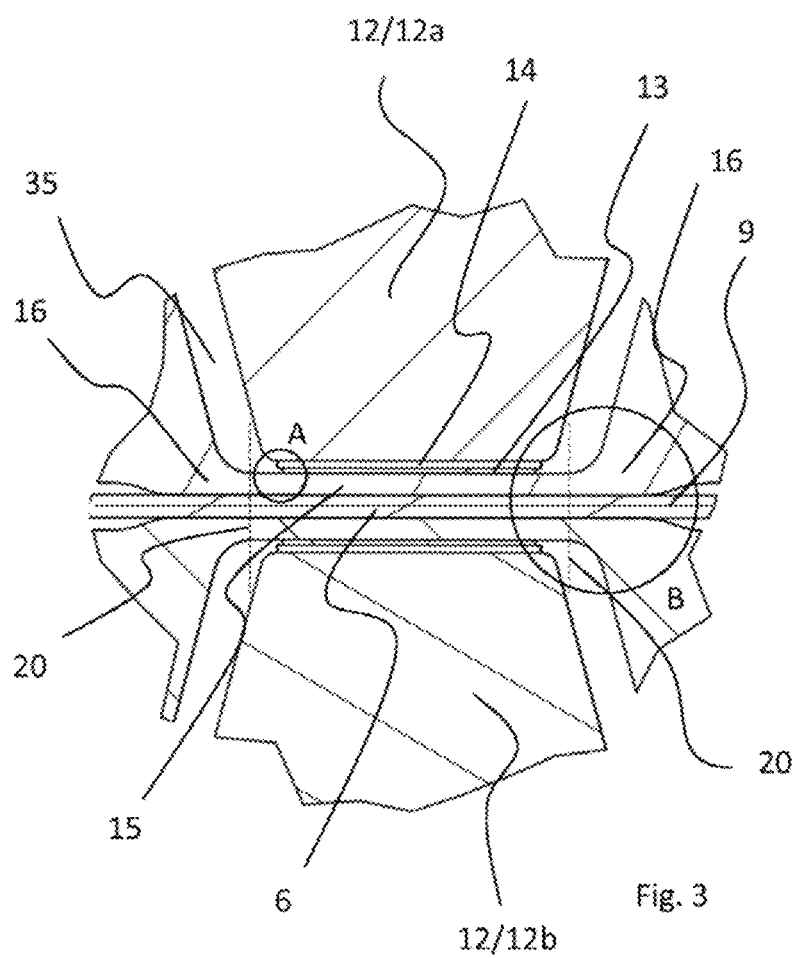
FIG. 3 is a detail view of FIG. 2.

FIG. 3 is a detail view of FIG. 2 in which it can be discerned that in each case one heating conductor 13 is arranged on the cooling elements 12a, 12b. A membrane 15 is heated via the heating conductor 13 in order to plasticize the plastic material of the films 9.

The welding process is carried out in a pulse operation. In this case, the cooling element 12a, 12b is continuously cooled with a liquid and the heating conductor 13 is heated in pulses in a time limited manner.

If electric power now flows through the heating conductor 13, the membrane 15, which rests on the films 9, is heated to a temperature of preferably 180° C. to 350° C. and plasticizes the films 9 in the region of the weld seam 6. The films 9 are plasticized or softened such that in order to form the weld seams 6, 7 and 8, the films 9 adhere to one another and/or the films 9 adhere with the weld-in section 5 of a port 2, 3. The surface of the weld-in section 5 can also be softened somewhat, if necessary.

The limits 20 of the weld seam 6 illustrated here are indicated with the dashed lines. The weld seam 6 is wider than the heating conductor 13. The heating conductor 13 is preferably between 10 and 30%, particularly preferably between 15 and 25% narrower than the weld seam 6. The heating conductor 13 is preferably between 3 and 6 mm wide. The clamping region 16 extends on the edge side of the border 20 of the weld seam 6. The top surface of the welding jaw 10, 10a/10b returns on the edge side of the clamping region 16 since the sealing surface 17 and the clamping regions 16 are formed as a sealing strip 32 protruding from the top surface of the welding jaw (see also FIG. 8 and FIG. 8a).

The membrane 15 is preferably formed integrally with the remaining upper part 11, 11a, 11b. The region of the membrane 15 comprises the sealing surface 17 of the respective welding jaw 10, 10a, 10b, 10c. The membrane 15 preferably has a thickness of just 250 to 600 μm and is delimited on the edge side of a solid block, which together form the respective upper part 11a, 11b. Due to its low thickness, the membrane 15 can be heated more quickly when the heating conductor 13 is switched on and is again cooled after switching off the heating conductor 13 owing to the permanent cooling. This enables a dynamic procedure. In particular, the adjoining clamping region 16 (see also below in the text) cannot be notably heated as a result.

The membrane 15 is clamped when heated and can possibly bulge slightly forwards, i.e. in the direction of the film 9, due to the thermal expansion. In this way, a larger force per area and therefore an addition pressure is exerted on the weld seam 6. As a result, the materially-bonded connection can be improved. This also leads to the depression 38 in the inner region 33i of the sealing surface 17 being able to be filled and any shape and/or dimensional tolerances being able to be balanced out by material flowing into these regions due to the additional pressure.

Due to the cooling, the clamping region 16 of the respective welding jaw 10a, 10b adjoining the border 20 of the weld seam 6 is cold such that the material in this region is not plasticized.

The welding jaws 10a, 10b thus rest on the films 9 and are not kept at a distance due to them resting with the adjoining clamping region 16, in which the plastic material cannot be liquefied and therefore not displaced such that the plasticized material is not pressed out in the region of the weld seam 6. During a welding process, a closed cavity is thus provided inside the welding jaws 10a, 10b, in which the weld seam 6 is then formed.

An insulating layer 14 is arranged between a heating conductor 13 and a cooling element 12a, 12b. The heating conductors 13 with an insulating layer 14, in particular a silicon layer, are for example placed on the cooling elements 12a, 12b.

The heating conductor 13 bears directly on the membrane 15 on the opposing side in order to ensure quick heating of the membrane 15. At the same time, the membrane 15 can bulge only forwards, i.e. in the direction of the film 9, when heated due to the heating conductor 13 bearing thereon. The heating conductor 13 and/or the membrane 15 are provided with a thin insulating layer (not shown). This prevents the membrane 15, which bears on the heating conductor 13, short-circuiting the heating conductor 13. To this end, the side of the membrane 15 bearing on the heating conductor 13 can e.g. be provided with an insulating oxide layer or a layer or film of polymides (not represented).

The side walls of the cooling element 12, 12a, 12b are each spaced apart by a gap 35 of the opposing side wall of a depression of the upper part 11a, 11b.

Figure 3A:
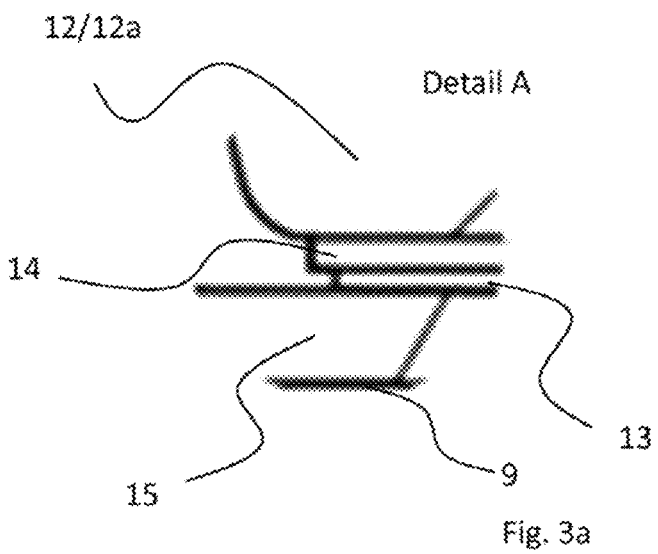
FIG. 3a and FIG. 3b are detail views of FIG. 3, in which the configuration of the heating conductor and the border of the clamping region are represented.

FIG. 3a is a detail view of the region A of the FIG. 3 according to one embodiment of the welding tool. The heating conductor 13 ends in this region. The heating conductor 13 is placed on the cooling element 12/12a here by means of an insulating layer 14, for example a silicon layer. The insulating layer 14 preferably establishes a materially-bonded connection of the heating conductor 13 to the cooling element 12/12a. The insulating layer 14 acts as a thermal insulating layer. It can also act as an electric insulating layer such that in particular further electric insulation of the cooling element 12/12a can be dispensed with.

The cooling element 12/12a is also continuously cooled during the welding process. In particular due to the insulating layer 14, the heating conductor 13 operated in the pulse operation is heated so strongly during a welding cycle that the membrane 15 is heated in the borders 20 of the weld seam 6 such that the plastic material of the adjoining film 9 is plasticized.

Figure 3B:
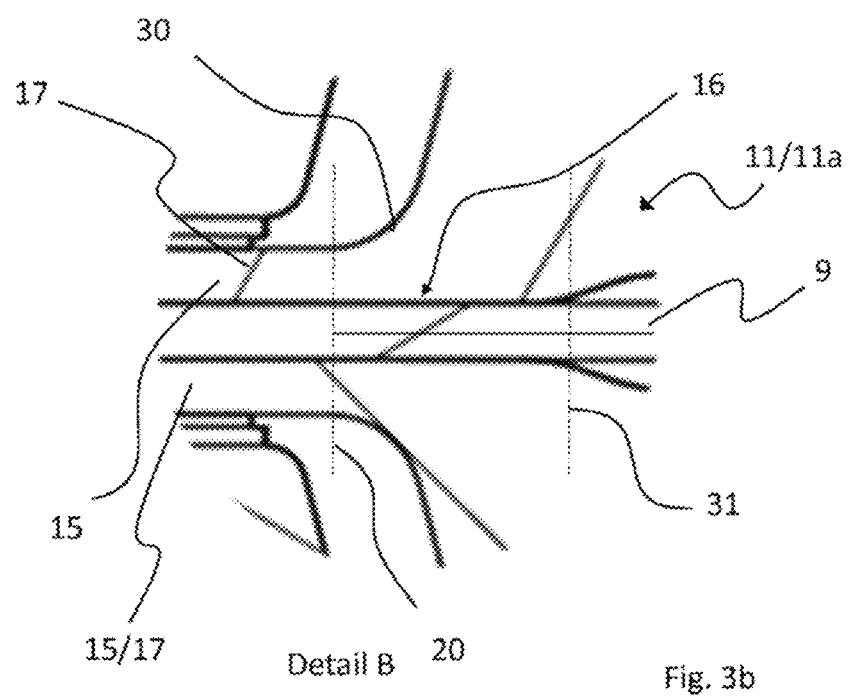

FIG. 3b is a detail view of the region B of the FIG. 3 according to one embodiment of the welding tool. The membrane 15 forms the sealing surface 17 in the region in which the membrane 15 is heated such that the plastic material is plasticized. The sealing surface 17 extends up to the border 20 of the weld seam 6. The membrane 15 ends in a transition region 30 rounded here and merges into the upper part 11a/11b formed as a block. The clamping region 16 adjoining the border 20 of the weld seam 6 begins in this exemplary embodiment roughly with the transition region 30.

The outer border 31 of the clamping region 16 is marked with a line. In this region, the sealing strip 32, which is formed of the sealing surface 17 and the clamping region 16, protrudes from the upper part IIa/IIb.

Figure 4:
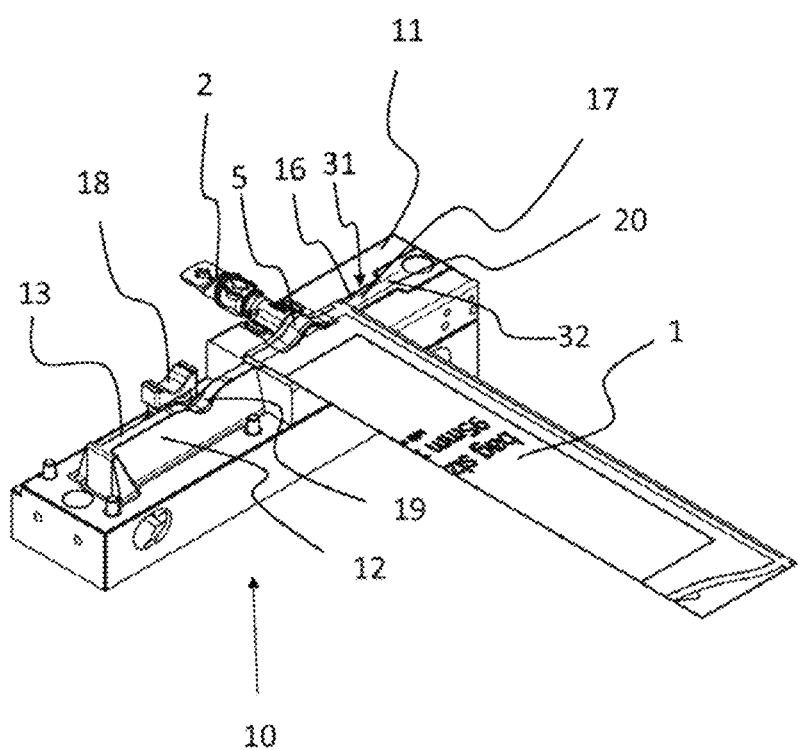
FIG. 4 is a perspective view of a welding jaw with bag attached and partially removed upper part.

FIG. 4 is a partially sectioned three-dimensional view of a welding jaw 10 on which a bag 1 is attached. To weld, the bag 1 or the films 9 with the weld seam 6 to be formed is clamped by a welding tool in accordance with the representation according to FIG. 2. The second welding jaw 10 of the welding tool is not represented here. The second welding jaw can be configured just like the welding jaw 10 to be seen here.

The upper part 11 of the welding jaw 10 and the bag 1 is hidden on the half represented on the left. The cooling element 12 protrudes into the upper part 11 and supports the heating conductor 13. The cooling element 12 is cooled here with a liquid, in particular with water.

The welding jaw 10 represented here is formed in order to also weld the port 2, 3 into the weld seam 6 in a welding process. To this end, the welding jaw 10 comprises at least one depression 19, which serves to receive the weld-in shuttle 5 of the port 2, 3. Furthermore, at least one holder 18 is provided to fix the upper part of a port 2, 3. The heating conductor 13 follows the contour of the weld-in shuttle 5 in the region of the depression 19 for the weld-in shuttle 5.

The upper part 11 of the welding jaw 10 comprises the sealing strip 32. The sealing strip 32 provides the sealing surface 17 and the clamping region 16. In addition, the sealing strip 32 protrudes from the upper part 11. It represents a kind of step or raised portion in the upper side of the upper part 11. The lateral borders of the sealing strip 32 are defined by the borders 31 of the clamping region 16 (see also FIG. 3b).

The sealing surface 17 heatable by the heating conductor 13 is provided in particular by the membrane 15. The sealing surface 17 is heated during a welding process, whereby the plastic material of the films 9 is plasticized.

The heating conductor 13 is heated for a few seconds, preferably for less than 3 seconds for a welding process. In this case, the power I (see also FIG. 5) flows through the heating conductor 13 formed as metal strips, whereby the heating conductor 13 is heated in spite of the continuous cooling via the cooling elements 12/12a/12b.

The heating system is then switched off and the material cools quickly again, in particular due to the cooling element 12. The cooling time until the opening of the welding jaws 10a, 10b is preferably less than 3 seconds.

The clamping region 16 of the welding jaw 10 adjoining the sealing surface 17 serves as a support on the film 9 of the bag 1 during the welding process and is permanently cooled.

Figure 5:
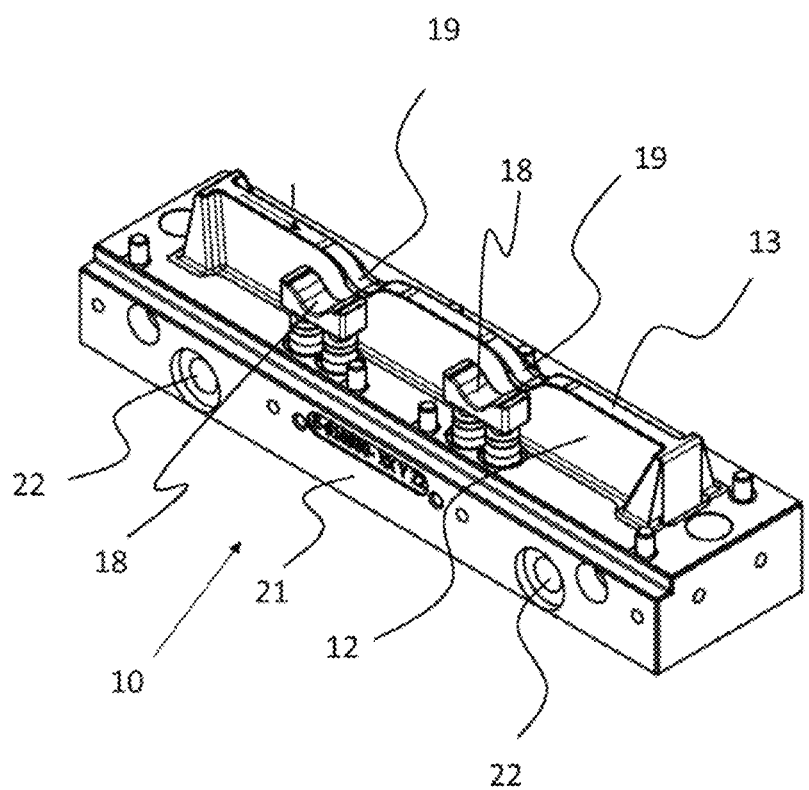
FIG. 5 is a perspective detail view of a welding jaw with completely removed upper part.

FIG. 5 is a perspective view of the welding jaw 10 with completely removed upper part 11.

The cooling element 12 comprises a base body or block 21 with the cooling means connections 22 from which protrudes the upper part of the cooling element 12, which supports the heating conductor 13. The depressions 19 serves to receive in each case one weld-in shuttle 5 of a port 2, 3. The upper parts of a port 2, 3 are supported by the holders 18.

The cooling element 12 preferably consists of a material with good heat conductivity, in particular of aluminum or copper or an aluminum or copper alloy.

The heating conductor 13 can be a copper strip. The heating conductor 13 can, however, for example also be a metal strip or an iron-nickel alloy, preferably with a thermal longitudinal expansion coefficient $\alpha$ lower than $5*10^{-6}$/K, particularly preferably lower than $2*10^{-6}$/K (at 20° C. to 300° C.).

Figure 6:
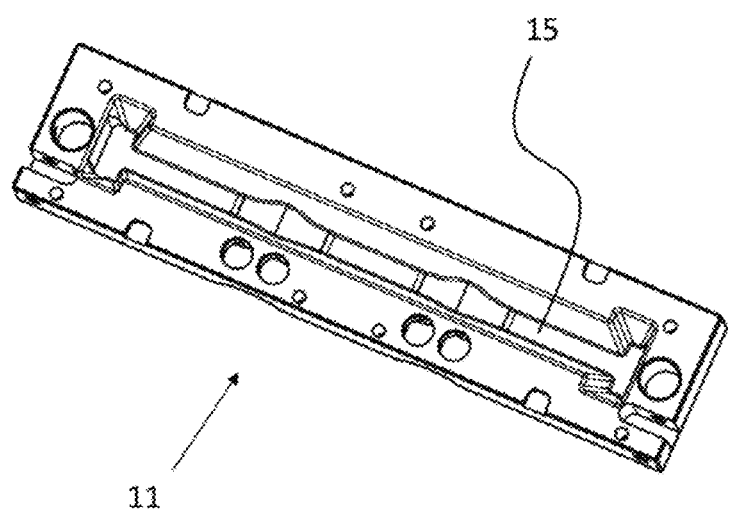
FIG. 6 is a perspective inner view of the upper part of a welding jaw.

FIG. 6 is a perspective inner view of the upper part 11 of a welding jaw 10. The membrane 15, whose opposing side forms the sealing surface 17, can be discerned in particular in this representation. The upper part 11 has a trench in which the cooling element 12 protrudes (see also FIG. 5). The upper part 11 is formed here as a solid block, in which the membrane 15 is clamped. The upper part 11 and the membrane 15 are preferably formed integrally.

The upper part 11 preferably consists of a metal with low thermal expansion, in particular of an iron-nickel alloy. The thermal longitudinal expansion coefficient α of the material is, in the case of a preferred embodiment of the invention, at 20° C. to 300° C., less than $5*10^{-6}$/K, particularly preferably less than $2*10^{-6}$/K.

Figure 7:
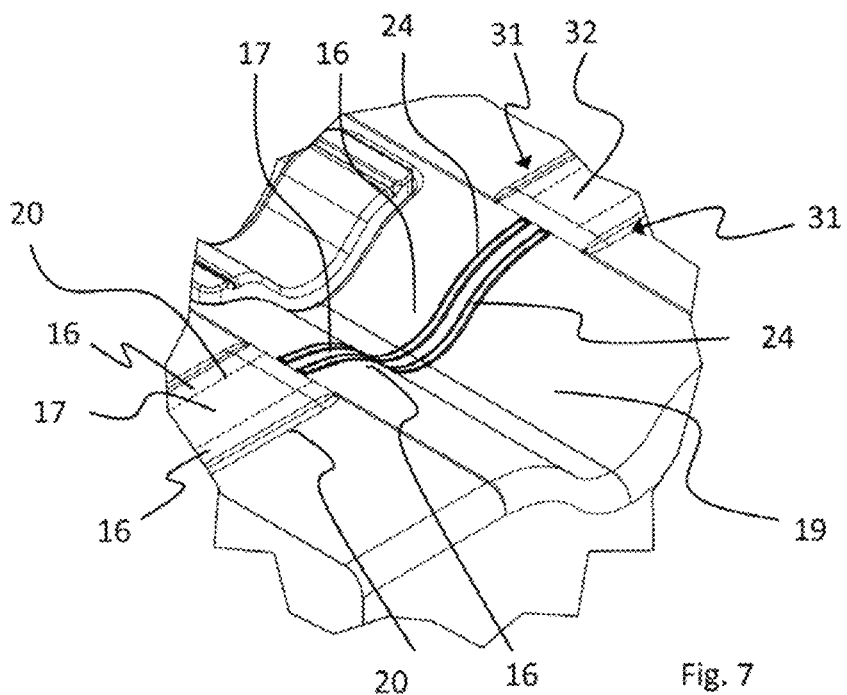
FIG. 7 is a perspective detail view of the region of a depression for the weld-in shuttle of a port in a welding jaw.

FIG. 7 is a perspective detail view of the region of the upper part 11a, 11b in which a depression 19 is present for the weld-in shuttle 5 of a port 2, 3. The depression 19 is formed as a trench-shaped indentation running transverse to the sealing strip 32, through which the sealing surface 17 extends in order to weld the film 9 with the weld-in shuttle 5 of a port 2, 3.

In order to illustrate the principle structure in this region, the sealing strip 32 or the sealing surface 17 is still represented here without a plateau 23 and also without recess 38 in the inner region 33i. In the represented example of the depression 19, two ribs 24 spaced apart from one another protrude from the sealing surface 17. However, the ribs 24 are optional and end here substantially in the region in which the depression 19 again merges into a level which forms the sealing surface 17 in the region in which two films 9 are welded together.

The sealing surface 17, the borders 20 of the weld seam 9 to be produced and the clamping region 16 and its borders 31 are illustrated here only in the level of the sealing surface 32. The listed features are not drawn in the depression 19 for presentation purposes. Further details of the sealing surface 17, such as e.g. the edge-side inner region 33i of the sealing surface 17, the preferably middle plateau 23 of the sealing surface 17 and the edge-side outer region 33a of the sealing surface 17 are also not entered for presentation purposes.

Figure 7A:
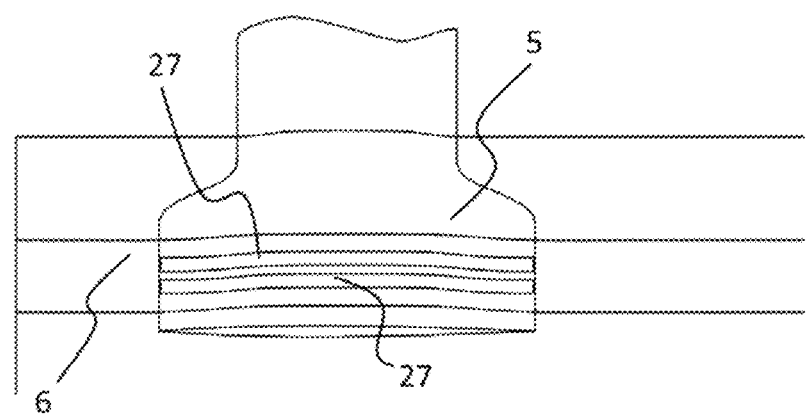
FIG. 7a is a perspective representation of the port region of a bag, which is manufactured with the welding tool represented in FIG. 7.

FIG. 7a is a detail view of the bag 1 in the region of a port 2, 3 of which the weld-in shuttle 5 is represented here. In this embodiment of a bag 1, the port 2, 3 has been welded in using the tool previously represented in FIG. 7. The weld seam 6 is illustrated, which runs both over the region, in which two films 9 overlap, and over the weld-in shuttle 5. In the region of the weld-in shuttle 5, two impressions 27 are present in this example. They correspond substantially to the optional ribs 24 of the sealing strip 32 or of the sealing surface 17. The two impressions 27 here run substantially parallel to the weld seam 6 and end in the region of the two tapering ends of the weld-in shuttle 5. The region of the weld seam 6 adjoining here consists only of the films 9 welded on one another.

Figure 8:
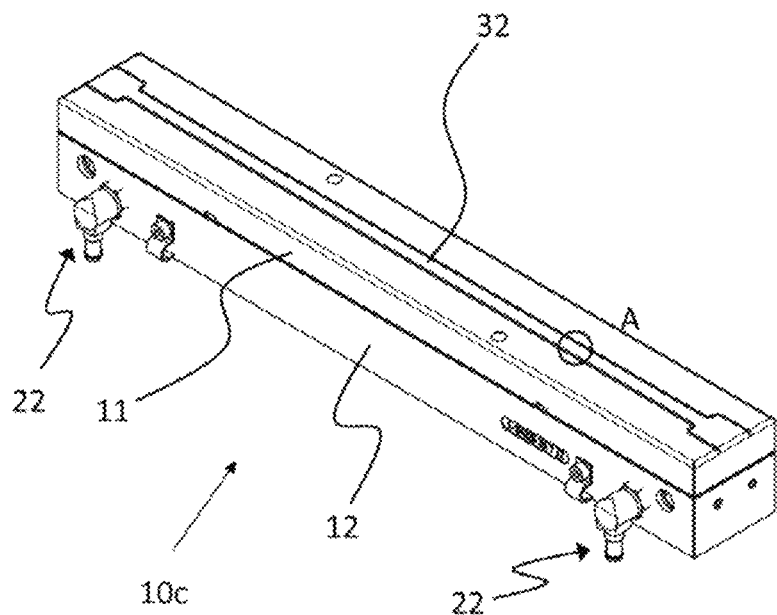
FIG. 8 shows an alternative embodiment of a welding jaw, which is used for the weld seams, in which two films are connected together directly (without weld-in shuttle of a port).

FIG. 8 shows in a perspective view a further embodiment of a welding jaw 10c which does not have depressions 19 to receive a weld-in shuttle 5 of a port 2, 3.

The welding jaw 10c represented here thus comprises a sealing strip 32 without depressions 19 and serves in particular to form the weld seams 7 and 8 represented in FIG. 1. The principle structure of this welding jaw 10c corresponds substantially to the structure of the previously described welding jaws 10, 10a and 10b. The sealing strip 32 protrudes from the upper part 11 of the welding jaw formed in particular here as a block.

Figure 8A:
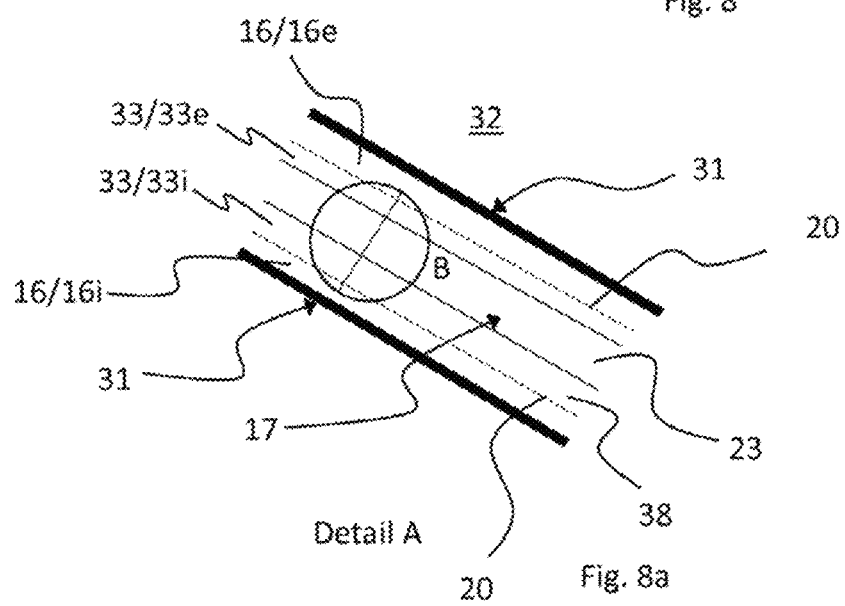
FIG. 8a is a detail view of the sealing strip of the welding jaw represented in FIG. 8.

FIG. 8a is a schematic detail view of the region A of the FIG. 8 which shows the sealing strip 32.

The sealing strip 32 is delimited by the borders 31 of the clamping regions 16, 16i, 16e. The borders 20 of the weld seam 6, 7, 8 define the extension of the sealing surface 17 (see also the FIGS. 3, 3a and 3b). The borders 20 of the weld seam 6, 7, 8 are fixed by the clamping regions 16, 16i, 16e.

The inner clamping region 16i delimits or defines an edge-side inner region 33i of the sealing surface 17. The edge-side inner region 33i of the sealing surface 17 produces the edge-side inner region 25i of the weld seam 6, 7, 8 during welding. The inner region 25i of the weld seam 6, 7, 8 adjoins the interior of the bag 1 on the edge side.

The outer clamping region 16e delimits or defines an edge-side outer region 33e of the sealing surface 17. The edge-side outer region 33e of the sealing surface 17 produces the edge-side outer region 25e of the weld seam 6, 7, 8 during welding. The outer region 25e of the weld seam 6, 7, 8 adjoins the external environment or the exterior of the bag 1 on the edge side.

Additionally, a plateau 23 and a recess 38 in the edge-side inner region 33i of the sealing surface 17, whose configuration and function are described below, extend inside the sealing surface 17 represented here over the sealing strip 32.

Figure 9:
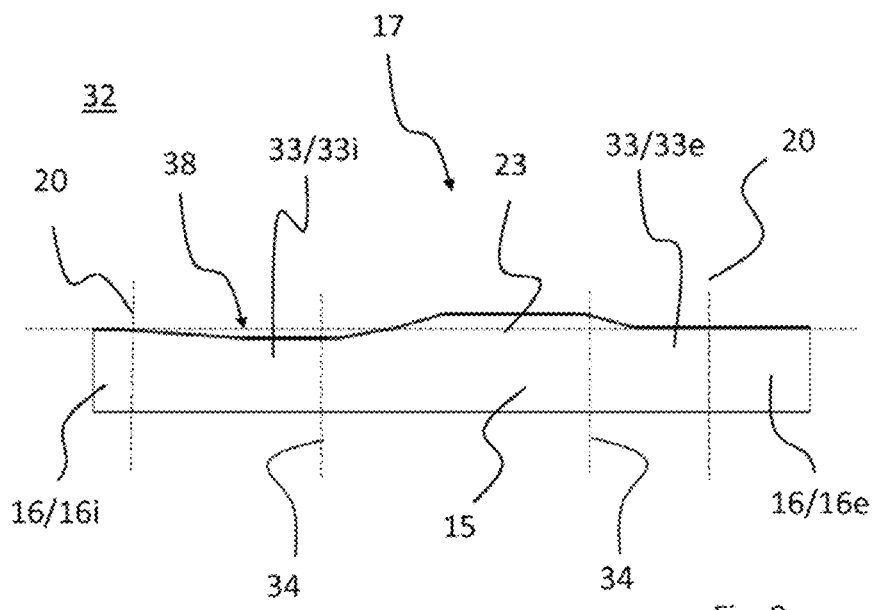

FIG. 9 is a sectional view along the dashed line drawn into FIG. 8a in the region B of the sealing strip 32. The section is configured in a level perpendicular to the main extension direction of the sealing strip 32.

The cross-section of an upper side section of the sealing strip 32 or the membrane 15 is represented over which the sealing surface 17 and the clamping regions 16e and 16i extend. The two outer borders 31 of the clamping regions 16e and 16i are not represented here.

In this exemplary embodiment, the sealing surface 17 or the membrane 15 in the region of the sealing surface 17 is not formed completely flat over the entire width. The sealing surface 17 comprises a plateau 23 and a recess 38 preferably adjoining the plateau 23. The plateau 23 provides a substantially middle region of the sealing surface 17. The recess 38 provides, in contrast, an edge-side inner region 33i of the sealing surface 17.

The borders 20 of the weld seam 6, by which the edge of the sealing surface 17 is also defined, run such that the plateau 23 and the recess 38 lie within the weld seam 6.

The plateau 23 is configured in this exemplary embodiment in particular as a plate-shaped level. The plateau 23 extends like a web or strip along the main extension direction of the sealing surface 17. The plateau 23 protrudes beyond the outer clamping region 16e and the inner clamping region 16i of the sealing strip 32. It is formed as a kind of step or protrusion in the upper side of the sealing strip 32, in particular of the sealing surface 17 and/or the membrane 15.

The sealing surface 17 still comprises the regions 33i and 33e adjoining the plateau 23.

The region 33e is the edge-side outer region of the sealing surface 17. This is the region 33e of the sealing surface 17, which establishes or provides the outer (external) region 25e of the weld seam 6, 7, 8. This is the region 25e of the weld seam 6, 7, 8 which adjoins the exterior of the bag 1. The edge-side outer region 33e of the sealing surface 17 lies in this exemplary embodiment at a height or substantially at a height with the adjoining outer clamping region 16e and in particular also with the inner clamping region 16i.

The aforementioned region 33i is the edge-side inner region of the sealing surface 17. This is the region 33i of the sealing surface 17, which establishes or provides the inner region 25i of the weld seam 6, 7, 8. This is the region 25i of the weld seam 6, 7, 8 which adjoins the interior of the bag 1. The recess 38 is arranged in the inner region 33i of the sealing surface 17. The inner region is preferably formed by the recess 38. The recess 38 or the inner region 33i of the sealing surface 17 is arranged recessed both with respect to the inner clamping region 16i and with respect to the plateau 23. The recess 38 or the inner region 33i of the sealing surface 17 is also arranged here recessed both with respect to the outer region 33e of the sealing surface 17 and with respect to the outer clamping region 16e.

The recess 38 or the recessed inner region 33i of the sealing surface 17 is configured in the exemplary embodiment in particular as a kind of trench. The recess 38 extends along the main extension direction of the sealing surface 17. The recess 38 has in the direction of the inner clamping region 16i a decreasing depth and merges, preferably directly, into the inner clamping region 16i. The recess 38, also in the direction of the plateau 23, has a decreasing depth and merges, preferably directly, into the plateau 23 arranged in the middle region of the sealing surface 17. The dotted horizontal line illustrates the height profile of the sealing strip 32 or the sealing surface 17, in particular the plateau 23 and the recess 38, in relation to the inner clamping region 16i and the outer clamping region 16e.

The plateau 23 therefore represents an asymmetric step in the upper side of the sealing strip 32. The plateau 23 has a greater height in the direction of the recess 38 than in the direction of the outer region 33e of the sealing surface 17.

An additional pressure is exerted on the film 9 in the region of the plateau 23 during the welding process. The pressure per area is greater in this region of the sealing surface 17 due to the plateau 23 than in the adjoining outer region 33e and the inner region 33i of the sealing surface 17.

On the one hand, the film 9 is pressed more strongly by the plateau 23 in the region of the weld seam 6, 7, 8. The melted and molten plastic material can as a result flow into possible cavities, which may be present due to shape and/or dimensional tolerances. However, it is essential that the melted, molten plastic material can flow into the adjoining recess 38. The plateau 23 pushes the molten material due to the higher pressure into the recess 38. Material is specifically introduced into the recess 38. After cooling and hardening of the material, this leads to a specific thickening of the film 9 in the edge-side inner region 25i of the weld seam 6, 7, 8. Through the increased film thickness in the inner region 25i of the weld seam 6, 7, 8, the mechanical properties of the bag produced can be notably improved, in particular in the case of a dynamic load, such as e.g. the bag falling on a hard substrate. The inner region 25i of the weld seam 6, 7, 8 represents the force input region during the fall. Through the increased film thickness in this region, the bag is more stable.

Figure 9A:
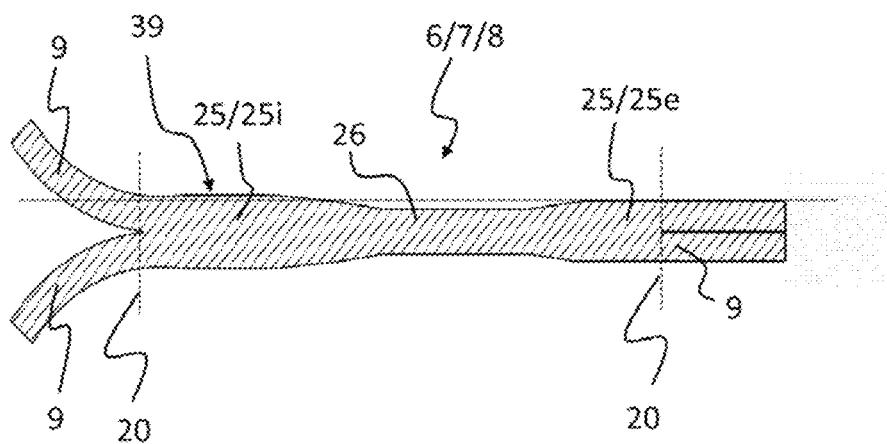
FIG. 9a is a schematic sectional view Sf/f of the region of a weld seam (see FIG. 1), which is manufactured with the welding tool represented in FIG. 8, FIG. 8a and FIG. 9.

The cross-section of a weld seam 6, 7, 8 produced in this manner is represented schematically in FIG. 9a.

FIG. 9a shows the sectional view of a weld seam 6, 7, 8 of a bag 1, which has been produced with the welding tool represented in FIGS. 8, 8a and 10, in the region in which two films 9 are welded together (see the section Sf/f in FIG. 1). On the side represented on the left here, the weld seam 6, 7, 8 adjoins the enclosed interior of the bag 1. On the side represented on the right here, the weld seam 6, 7, 8 adjoins the external space or the environment of the bag 1. The two films 9 are not welded together left and right of the borders 20 of the weld seam 7.

The contour or the profile of the weld seam 7 is an impression of the contour or the profile of the sealing surface 17 represented in FIG. 9. The dotted horizontal line illustrates the height profile of the weld seam 6, 7, 8, in particular of the middle region 26 of reduced thickness and of the edge-side inner region 25i, 39 of increased thickness in relation to the outer region 25e of the weld seam 6, 7, 8.

A thinned-out region 26 is present in the middle part of the weld seam 7 to which adjoin, on the one hand, the outer non-thinned-out neighboring region 25e and the inner thickened neighboring region 25i. The thinned-out region 26 represents the impression of the plateau 23. In contrast, the thickened region 25i (represented here on the left) represents the impression of the recess 38. The weld seam region 25i adjoining the interior of the bag 1 and the weld seam region 25e adjoining the (external) environment of the bag 1 (represented here on the right) have a greater thickness than the thinned-out region 26. The greater thickness $D_I$ of the weld seam 6, 7, 8 in the inner region 25i adjoining the interior has proven very advantageous for the stability of the weld seam 6, 7, 8.

In the outer region 25e of the weld seam 6, 7, 8, the welded film has a thickness $D_E$, which corresponds substantially to the sum of the two individual film thicknesses.

The weld seam 6, 7, 8 merges into a region 26 of reduced thickness $D_P$ in the direction of its inner side. The thickness in this region 26 is smaller than the sum of the two individual film thicknesses. This reduced thickness $D_P$ results from the material displacement due to the plateau 23 of the sealing surface 17. A reduced thickness in this middle region is not critical for the mechanical stability of the bag 1 or the weld seam 6, 7, 8. The forces predominantly affect the edge side of the weld seams 6, 7, 8 during pressure loading or a dynamic load, such as e.g. during the fall test.

The forces in particular affect the inner region 25i of the weld seam 6, 7, 8.

The region 26 of reduced thickness merges into the edge-side inner region 25i of the weld seam 6, 7, 8 further in the direction of the inner side of the weld seam 6, 7, 8. The inner region 25i of the weld seam 6, 7, 8 has, in particular at the edge side in relation to the bag interior, a greater thickness $D_I$ than the two regions 26 and 25e with $D_I > D_E$ and $D_I > D_P$. The thickness $D_I$ of the weld seam 6, 7, 8 in this thickened or strengthened region 25i is greater than the sum of the two individual film thicknesses D.

The thickness $D_I$ of the weld seam 6, 7, 8 in this strengthened region 25i is preferably at least in sections $2D < D_I < 2.5\ D$, preferably $1.1\ 2D < D_I < 1.5\ 2D$, particularly preferably $1.1\ 2D < D_I < 1.25\ 2D$. The width of the strengthened inner region 25i corresponds preferably substantially to the width of the recess 38 (see below).

The thickness $D_P$ of the weld seam 6, 7, 8 in the region 26 of reduced thickness is preferably at least in sections $0.5\ 2D < D_P < 2D$, preferably $0.6\ 2D < D_P < 0.9\ 2D$, particularly preferably $0.7\ 2D < D_P < 0.8\ 2D$. The width of the region 26 of reduced thickness corresponds preferably substantially to the width of the plateau 23 (see below).

The thickness $D_E$ of the weld seam, 6, 7 in the outer region 25e is preferably at least in sections $0.8\ 2D < D_E < 1.2\ 2D$, preferably $0.9\ 2D < D_E < 1.1\ 2D$, particularly preferably $2D\ D_E$. The width of the outer region 25i corresponds preferably substantially to the width of the outer region 33e of the sealing surface 17 (see below).

FIG. 10 is an enlarged detail view of FIG. 2. FIG. 10a and FIG. 10b are in turn detail views of the left and the right side of FIG. 10. Further details of the profiled sealing surface 17 are explained on the basis of these representations.

The sealing strip 32 delimited by the outer border 31 of the clamping regions 16 is preferably between 5 and 15 mm, particularly preferably between 6 and 12 mm wide.

In a preferred configuration, the plateau 23 has a height of above 10 μm and/or of below 100 μm, preferably of below 60 μm (relative to the clamping region 16e) and/or a width of 1.5 mm to 2.5 mm, preferably 1.8 mm to 2.2 mm. As a result, there is no danger of larger quantities of molten plastic being pushed into the adjoining clamping region 16. The adjoining cooled clamping region 16 is consequently sealed due to the film 9 bearing thereon.

Since the membrane 15 is overall very thin, it is elastic and can for its part in turn avoid a pressure in the volume which is formed by the molten plastic.

The plateau 32 is arranged in a middle region of the sealing surface 17 between the edge-side inner region 33i and the edge-side outer region 33e of the sealing surface 17. The plateau 23 or its longitudinal axis is not positioned centrally in the sealing surface 17, but rather laterally offset to the outer side.

The plateau 23 is narrower than the entire width of the sealing surface 17. The width of the sealing surface 17 is in particular 3 mm to 6 mm. The plateau 23 is preferably also narrower than the heating conductor 13, in particular narrower by 0.2 to 0.8 mm. The borders 34 of the heating conductor 13 are marked with a dashed line. The heating conductor 13 itself is narrower than the weld seam 6, 7, 8 since the membrane 15 is also heated so strongly laterally adjoining the heating conductor 13 that the material of the film 9 is plasticized up to the border 20 of the weld seam 6.

In a top view of the sealing strip 32, the plateau 23 and/or also the recess 38 are positioned overlapping with the heating conductor 13. As a result, sufficient heat input can be ensured in these two regions to produce the weld seams 6, 7, 8. Preferably, up to 90% of the width of the plateau 23 is in the region of the heating element 13. Preferably, up to 40% of the width of the recess 38 is in the region of the heating element 13.

In contrast, in this configuration, the edge-side outer region 33e of the sealing surface 17 is completely outside of the heating conductor 13. In spite of this, sufficiently high heat input can still be provided. The edge-side outer region 33e of the sealing surface 17 has a smaller width than the edge-side inner region 33i of the sealing surface 17. The edge-side outer region 33e of the sealing surface 17 also has a smaller width than the plateau 23 of the sealing surface 17. The edge-side outer region 33e of the sealing surface 17 preferably has a width of 0.5 mm to 1 mm.

The plateau 23 has a height decreasing to the outer side of the sealing surface 17 and merges, preferably at the same time, into the outer region 33e of the sealing surface 17. The plateau 23 also preferably has a height decreasing in the direction of the inner side of the sealing surface 17 and merges, preferably at the same time, into the inner region 33i of the sealing surface 17. The plateau 23 preferably has in sections or at least in sections a height of 35 µm to 60 µm.

In a preferred embodiment of the invention, the value of the (maximum) depth of the recess 38 is less than the value of the (maximum) height of the plateau 23 (relative to the two clamping regions 16i and 16e). The recess 38 preferably has at least in sections a depth of 30 µm to 50 µm. The difference in height between the highest point of the plateau 23 and the deepest point of the recess 38 is therefore in a range of 70 µm to 110 µm. The width of the recess 38 corresponds here preferably substantially to the width of the plateau 23.

The depth of the recess 38 decreases, preferably at the same time, towards the inner side of the sealing surface 17 and then merges into the inner clamping region 16i. The inner clamping region 16i defines the inner border of the weld seam. The inner clamping region 16i can be reduced somewhat in its height. As a result, escape of air is enabled. On the other hand, this results in a transition, which is not sharply defined or is less sharply defined, from the upper side of the inner region 25i of the weld seam 6, 7 to the upper side of the non-welded film section (see also FIG. 10c).

Based on its height, width and length, a mathematical displacement volume VV can be assigned to the plateau 23. Accordingly, a mathematical receiving volume AV can also be assigned to the recess 38. The displacement volume VV of the plateau 23 is selected in one embodiment to be greater than the receiving volume AV of the recess 38. Preferably 1.1 AV<VV<1.5 AV. In an approximation, the displacement volume VV of the plateau 23 and the receiving volume AV of the recess 38 can be determined by the areas of VV and AV being calculated in the cross-section of the weld seam 6, 7, 8 (as illustrated in FIG. 10).

Figure 10C:
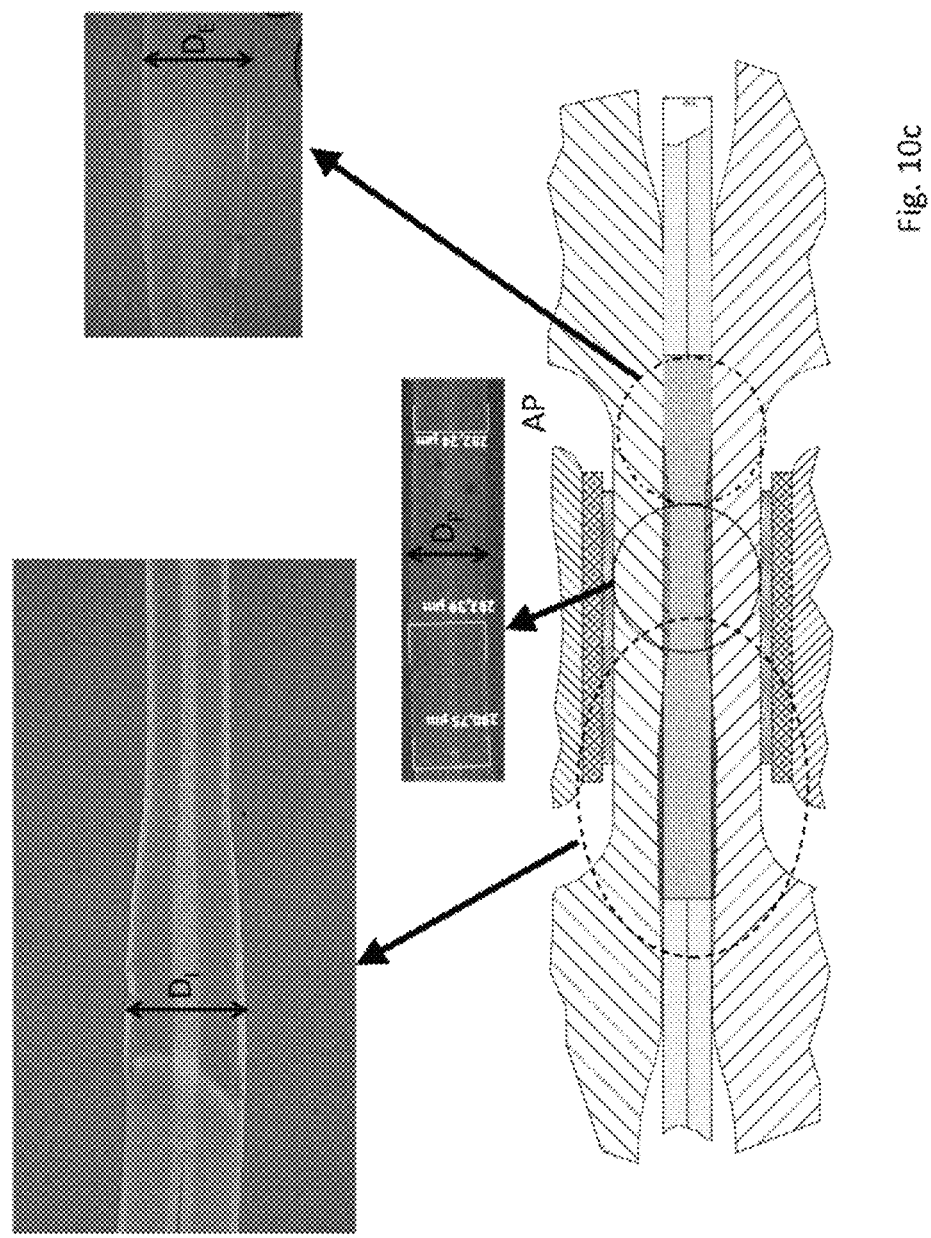
FIG. 10c shows the enlarged detail view from FIG. 10 with microscopic sectional views of the weld seam.

FIG. 10c again shows the enlarged detail view from FIG. 10 with microscopic sectional views of different sections of the weld seam 6, 7, 8.

As an example, two films 9 have been used here with a thickness D each of 195 µm. The weld seam 6, 7, 8 has in the edge-side outer region 25e of the weld seam 6, 7, 8 a thickness $D_E$ of roughly 390 µm and therefore corresponds to the sum of the individual thicknesses of the film 9. The thickness $D_P$ in the region 26 of reduced thickness of the weld seam 6, 7, 8 has been reduced by the plateau 23 to roughly 280 µm to 295 µm. Through the recess 38, the thickness $D_I$ in the edge-side inner region 25i of the weld seam 6, 7, 8 has been increased to roughly 450 µm to roughly 500 µm. It applies generally here that $D_I > D_P$ and that $D_I > D_E$ and that $D_E > D_P$.

FIG. 11 is the section Sp/f of a weld seam 6 in the region of the weld-in shuttle 5 of a port 3 (see FIG. 1), which is manufactured for example with the welding tool represented in FIG. 4. On the side represented on the right here, the weld seam 6 adjoins the enclosed interior of the bag 1. On the side represented on the left here, the weld seam 6 adjoins the external space or the environment of the bag 1.

The weld seam 6 has inside its borders 20 a thinned-out region 26, which is present due to the impression of the plateau 23, and has a strengthened region 39, which is present due to the profile of the recess 38.

The thinned-out region 26 lies substantially centrally in the weld seam 6. Adjoining the thinned-out region 26, there is a neighboring region 25i, in which the film 9 is strengthened or thickened, and a neighboring region 25e, in which the film 9 is not substantially thinned out. The film 9 is also welded or connected to the port 2, 3 or to its weld-in shuttle 5 in these regions 25i and 25e. The greater thickness in the inner edge region 25i of the weld seam 6 has in this case proven advantageous for the stability of the weld seam 6 overall.

FIG. 11a now shows a detail view of the port region of a bag 1, which has been manufactured for example with the welding tool represented in FIG. 11. The weld seam 6 extends here over the edge of the bag 1 and over the port 2, 3 or its weld-in shuttle 5.

Figure 12:
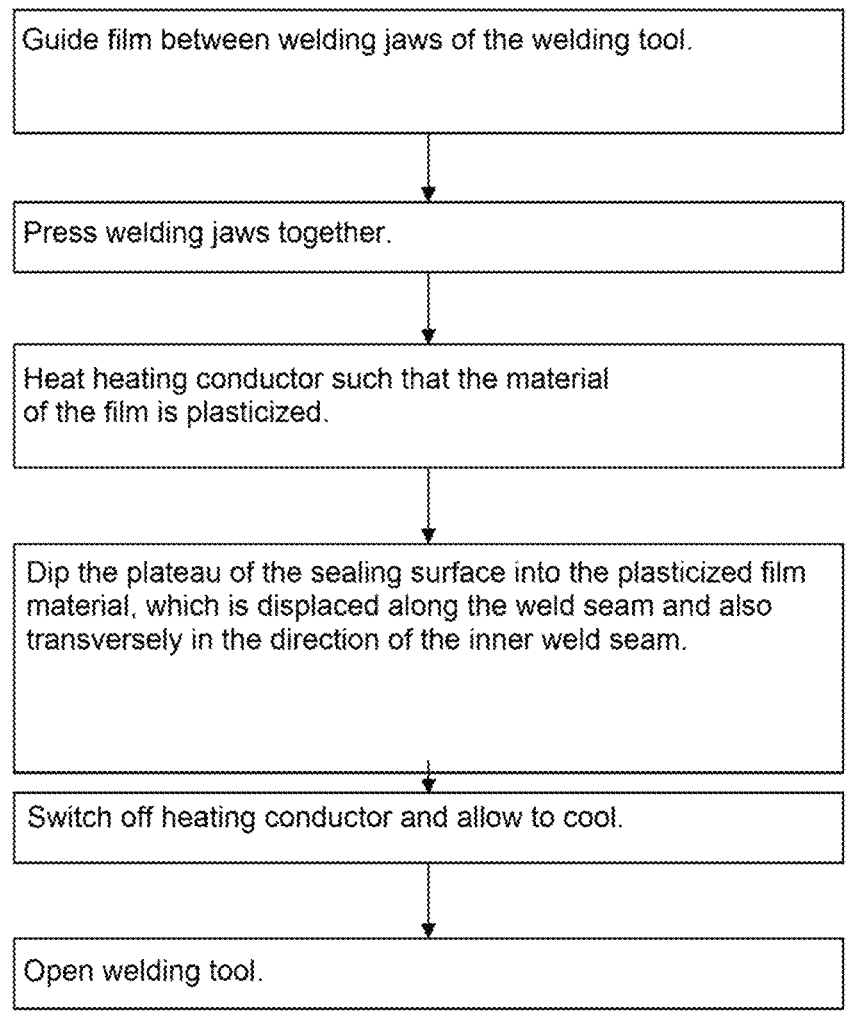

FIG. 12 is a flow diagram of the method steps of an exemplary embodiment of a welding method according to the invention.

The welding method is configured as a non-continuous pulse method, in particular with permanent cooling.

Firstly, the film 9 is supplied between the welding jaws 10, 10a, 10b, 10c of the welding tool.

Then, the two welding jaws 10, 10a, 10b, 10c are pressed together or closed. The closed state is firstly defined by the stop of the plateau 23. The plateaus serve as a kind of spacer. The clamping regions 16 of the upper and the lower welding jaw 10, 10a, 10b, 10c preferably still do not come to a stop in this state.

The respective heating conductor 13 is heated. The sealing surfaces 17 are heated by the heating conductor 13. The heating is such that the films 9 are plasticized in the region of the sealing surfaces 17. The plateaus 23 can dip into the now free-flowing film material. The welding jaws 10, 10a, 10b, 10c close completely as a result. The clamping regions 16 now lie separated by the films 9 on one another. The clamping regions 16 are cool and cooled such that the films 9 are not plasticized there. As a result, a more closed space is formed.

Liquid film material is specifically displaced into the plasticized films 9 by the dipping of the plateau 23. The film material is displaced into the recesses 38 and in particular also laterally along the weld seam 6, 7, 8. The film material displaced into the recesses 38 leads to a specific increase of the film thickness in the edge-side inner region 25i of the weld seam 6, 7, 8. The film material displaced in particular laterally can also balance out any shape and/or dimensional tolerances in the films 9 and/or in the ports 5 or fill them. In contrast, the film thickness is substantially retained in the outer edge region 25e of the weld seam 6, 7, 8.

The membrane 15 of the welding jaws 10, 10a, 10b, 10c can bulge and pressure can also be exerted on the weld seam 6, 7, 8. According to another embodiment of the invention, the heating conductor 13 can also already be heated before the welding jaws 10, 10a, 10b, 10c are pressed together.

Then, the power supply to the heating conductor 13 is switched off and the weld seam 6 cooled, amongst other things due to the preferably constant cooling means supply such that the welding tool can be opened when the material of the films 9 has been adequately hardened once again.

View as a whole, the method according to the invention can be compared with a combination of seam welding and injection molding methods. A more closed region is formed namely by clamping the film 9, in which the material is molten during the welding process. By adapting the contour of the sealing surface 17 of the welding jaw in this region, it is possible to specifically change the contour of the weld seam 9 or the contour of the films 9 in the region of the weld seams 6, 7, 8.

The mechanical stability of a weld seam 6, 7, 8 can be notably increased by the invention. In addition, the sensitivity of a pulse welding method for welding plastic films with respect to shape and dimensional tolerances, in particular with respect to shape and dimensional tolerances of a ports to be welded in can be significantly reduced.

LIST OF REFERENCE NUMERALS

1 Bag
2 Port
3 Port
4 Hanger
5 Weld-in section or weld-in shuttle
6 Weld seam (transverse weld seam)
7 Weld seam (longitudinal weld seam)
8 Weld seam (transverse weld seam with hanger)
9 Film
10, 10a, 10b, 10c Welding jaw
11, 11a, 11b Upper part
12, 12a, 12b Cooling element
13 Heating conductor
14 Insulating layer
15 Membrane
16 Clamping region
16i Inner clamping region
16e Outer clamping region 17 sealing surface
18 Holder
19 Depression
20 Border of the weld seam
21 Block
22 Cooling means connection
23 Plateau
24 Rib
25 Neighboring region to thinned-out region
25i Edge-side inner region of the weld seam (adjoining the interior of the bag)
25e Edge-side outer region of the weld seam (adjoining the external environment of the bag)
26 Region in the weld seam which is reduced in thickness or thinned out
27 Impression of the rib in the weld seam
28a, 28b Lower part
29a 29b Cooling channel
30 Transition region (of the membrane)
31 Border of the clamping region
32 Sealing strip
33 Outer region of the sealing surface
33i Edge-side inner region of the sealing surface
33e Edge-side outer region of the sealing surface
34 Border of the heating conductor
35 Gap between cooling element and upper part
36 Transition plateau—recess (or inner region of the weld seam)
37 Transition plateau—outer region of the weld seam)
38 Recess
39 Region in the weld seam which is increased in thickness or strengthened

The invention claimed is:

1. A welding tool for pulse welding a film made of plastic of a medical pack, comprising a welding jaw with a sealing strip, which extends along the welding jaw and can be pressed onto the film, wherein the sealing strip, in order to form a weld seam, comprises a heatable sealing surface in order to plasticize plastic material of the film at least adjoining the sealing surface and, on the edge side in relation to the sealing surface, has an adjoining, inner clamping region and an adjoining, outer clamping region for clamping the film during welding of the film, characterized in that the sealing surface has a raised portion arranged in a middle region, wherein an edge-side inner region of the sealing surface adjoining the inner clamping region is arranged recessed at least in sections both with respect to the inner clamping region and with respect to the raised portion.

2. The welding tool according to claim 1, wherein the raised portion is provided by a plateau, which protrudes from a top surface of the sealing surface and/or in that the inner region arranged recessed is provided as a trench.

3. The welding tool according to claim 1, wherein an edge-side outer region of the sealing surface adjoining the outer clamping region is arranged recessed both with respect to the outer clamping region and with respect to the raised portion or in that an edge-side outer region of the sealing surface adjoining the outer clamping region is arranged recessed with respect to the raised portion and substantially at a height of the outer clamping region.

4. The welding tool according to claim 3, wherein the edge-side outer region of the sealing surface adjoined the outer clamping region is arranged raised with respect to the inner region of the sealing surface adjoining the inner clamping region.

5. The welding tool according to claim 1, wherein a longitudinal axis of the raised portion is arranged laterally offset outwards with respect to a longitudinal axis of a heating conductor.

6. The welding tool according to claim 5, wherein the raised portion ends in the region of a heating conductor towards an inner side and extends towards an outer side beyond the heating conductor, wherein the raised portion, on its inner side, adjoins the edge-side inner region of the sealing surface and merges directly into the edge-side recessed region.

7. The welding tool according to claim 1, wherein the edge-side inner region of the sealing surface starts in the region of a heating conductor towards the outer side and extends towards the inner side beyond the heating conductor and/or in that a longitudinal axis of the edge-side inner region of the sealing surface is arranged laterally offset inwards with respect to a longitudinal axis of the heating conductor.

8. The welding tool according to claim 1, wherein the recessed edge-side region of the sealing surface in sections has a depth decreasing in the direction of the inner clamping region and merges, preferably directly, into the inner clamping region and/or has a depth decreasing in sections in the direction of the raised portion and merges into the raised portion.

9. The welding tool according to claim 1, wherein the raised portion has a displacement volume VV and the recessed inner region has a receiving volume AV, wherein the displacement volume VV of the raised portion is greater than the receiving volume AV of the recessed inner region.

10. The welding tool according to claim 1, wherein the upper part of the welding tool has at least one depression which is formed to receive a weld-in section of a port.

11. A use of a welding tool according to claim 1, to manufacture a medical pack formed as a bag.

12. A pulse welding method with a welding tool for pulse welding a film made of plastic of a medical pack, according to claim 1, wherein a welding jaw of the welding tool is pressed with a heatable sealing surface to form a weld seam on the film such that a cavity is formed in the welding tool during the welding by the film being clamped on the edge side in relation to the sealing surface, during the welding process by an inner and outer clamping region, which is cooler compared to the sealing surface and extends on the edge side to the sealing surface, and plasticized plastic material of the film being pushed by a raised portion of the sealing strip into an edge-side inner region of the sealing surface recessed at least in sections such that a film thickness is increased in an edge-side inner region of the weld seam, wherein the edge-side inner region of the sealing surface is arranged recessed at least in sections both with respect to the inner clamping region and with respect to the raised portion.

13. The pulse welding method according to claim 12, wherein the welding jaw of the welding tool is continuously cooled by means of a cooling element with a fluid and the sealing surface is heated in pulses in a time limited manner by means of a heating conductor.

14. The pulse welding method according to claim 12, wherein at least one port is welded into the weld seam.

15. The pulse welding method according to claim 14, wherein the sealing surface is more strongly heated in the region in which the port is welded in than in an adjoining region of the sealing surface in which two films are welded together.

16. The pulse welding method according to claim 12, wherein the pack is filled with a medical liquid preferably containing an active ingredient, preferably via the port is sealed after filling and is sterilized, preferably autoclaved, in particular after sealing.

17. A medical pack formed as a bag, which comprises films welded together, wherein the bag comprises at least one weld seam, which at least in sections has a region, which is reduced in thickness with respect to an adjoining neighboring region of the welding seam, wherein the neighboring region is provided by an edge-side inner region of the weld seam and by an edge-side outer region of the weld seam and the edge-side inner region of the weld seam has a thickness $D_I$ which at least in sections is greater than a total thickness of the films welded together, wherein the total thickness is the sum of the individual thicknesses D of the films, wherein the thickness $D_I$ of the weld seam in the edge-side inner region at least in sections is 2D $<D_I<$2.5 D and a thickness $D_P$ of the weld seam in the region of reduced thickness at least in sections is 0.5 2D $<D_P<$2D and a thickness $D_E$ of the weld seam in the outer region at least in sections is 0.8 2D $<D_E<$1.2 2D.

18. The medical pack formed as a bag according to claim 17, wherein the region, which is reduced in thickness, extends in a strip-shaped manner along a region of the weld seam and/or in that the region, which is increased in thickness, extends in a strip-shaped manner along a region of the weld seam.

19. A welding tool for pulse welding a film made of plastic of a medical pack the welding tool comprising a welding jaw with a sealing strip, which extends along the welding jaw and can be pressed onto the fil, wherein the sealing strip, in order to form a weld seam, comprises a heatable sealing surface in order to plasticize plastic material of the film at least adjoining the sealing surface and, on the edge side in relation to the sealing surface, has an adjoining, inner clamping region and an adjoining, outer clamping region for clamping the film during welding of the film, characterized in that the sealing surface has a raised portion arranged in a middle region, wherein an edge-side inner region of the sealing surface adjoining the inner clamping region is arranged recessed at least in sections both with respect to the inner clamping region and with respect to the raised portion, wherein a thickness $D_I$ of the weld seam in the inner region at least in sections is greater than a thickness $D_P$ of the weld seam in the region of reduced thickness and is greater than a thickness $D_E$ of the weld seam in the outer region.

20. The medical pack formed as a bag according to claim 17, wherein a thickness $D_E$ of the weld seam in the outer region at least in sections is greater than a thickness $D_P$ of the weld seam in the region of reduced thickness.

21. The medical pack formed as a bag according to claim 17, wherein a thickness $D_I$ of the weld seam in the thickened inner region at least in sections is greater than a sum of the individual thicknesses D of the films and/or in that a thickness $D_P$ of the weld seam in the region of reduced thickness at least in sections is smaller than a sum of the individual thicknesses D of the films and/or in that a thickness $D_E$ of the weld seam in the outer region at least in sections corresponds substantially to a sum of the individual thicknesses D of the films.

22. The medical pack formed as a bag according to claim 17, wherein a thickness $D_I$ of the weld seam in the thickened region at least in sections is 1.1 2D $<D_I<$1.5 2D and/or in that a thickness $D_P$ of the weld seam in the region of reduced thickness at least in sections is 0.6 2D $<D_P<$0.9 2D and/or in that the thickness $D_E$ of the weld seam in the outer region at least in sections is 0.9 2D $<D_E<$1.1 2D.

23. The medical pack formed as a bag according to claim 17, wherein at least one port is welded into the weld seam via a weld-in section, wherein the edge-side inner region of the weld seam has a thickness which is at least in sections greater than a thickness of the welded film.

24. A pharmaceutical product comprising a medical pack formed as a bag according to claim 17, wherein the bag is filled with a medical liquid containing an active ingredient.

* * * * *